(12) United States Patent
Sanchez

(10) Patent No.: US 12,292,728 B2
(45) Date of Patent: May 6, 2025

(54) SOFT SMART RING AND METHOD OF MANUFACTURE

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 18/395,428

(22) Filed: Dec. 22, 2023

(65) Prior Publication Data

US 2024/0126236 A1 Apr. 18, 2024

Related U.S. Application Data

(63) Continuation of application No. 16/927,394, filed on Jul. 13, 2020, now Pat. No. 11,853,030.

(Continued)

(51) Int. Cl.
*G05B 19/4099* (2006.01)
*B29C 64/10* (2017.01)
(Continued)

(52) U.S. Cl.
CPC .......... *G05B 19/4099* (2013.01); *B29C 64/10* (2017.08); *B29C 64/20* (2017.08);
(Continued)

(58) Field of Classification Search
CPC ...... G05B 19/4099; G05B 2219/49007; B29C 64/10; B29C 64/20; B29C 64/393;
(Continued)

(56) References Cited

U.S. PATENT DOCUMENTS 2,737,192 A 3/1956 Bieler
3,792,192 A 2/1974 Plate
(Continued)

FOREIGN PATENT DOCUMENTS

CN 103109462 A 5/2013
CN 104799509 7/2015
(Continued)

OTHER PUBLICATIONS

Adafruit.com, "RFID/NFC Smart Ring—Size 12—NTAG213," Accessed at https://web.archive.org/wb/20190605061438/https://www.adafruit.com/product/2806 Jun. 5, 2019.
(Continued)

*Primary Examiner* — Yuhui R Pan
(74) *Attorney, Agent, or Firm* — BRYAN CAVE LEIGHTON PAISNER LLP

(57) ABSTRACT

A smart ring includes a body. The body includes a first part including at least a part of a sensor unit. The body also can include a second part including at least a part of an output unit and removably connected to the first part of the body. The body can further include a first pair of removable portions. The first pair of removable portions can include a first removable portion connected to the first part of the body. The first pair of removable portions also can include a second removable portion connected to the second part of the body. The first removable portion can be removable from the body. The second removable portion can be removable from the body. Other embodiments are disclosed.

20 Claims, 9 Drawing Sheets

Related U.S. Application Data

(60) Provisional application No. 62/988,065, filed on Mar. 11, 2020, provisional application No. 62/877,391, filed on Jul. 23, 2019.

(51) Int. Cl.

| | | |
|---|---|---|
| *B29C 64/20* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |
| *B33Y 80/00* | (2015.01) | |
| *A44C 9/00* | (2006.01) | |
| *B29L 31/00* | (2006.01) | |

(52) U.S. Cl.
CPC ............ *B29C 64/393* (2017.08); *B33Y 10/00* (2014.12); *B33Y 30/00* (2014.12); *B33Y 50/02* (2014.12); *B33Y 80/00* (2014.12); *A44C 9/0053* (2013.01); *B29L 2031/7096* (2013.01); *G05B 2219/49007* (2013.01)

(58) Field of Classification Search
CPC ....... B29C 64/386; B33Y 10/00; B33Y 30/00; B33Y 50/02; B33Y 80/00; B33Y 50/00; A44C 9/0053; B29L 2031/7096
See application file for complete search history.

(56) References Cited

U.S. PATENT DOCUMENTS

| | | |
|---|---|---|
| 4,012,629 A | 3/1977 | Simms |
| 4,382,112 A | 5/1983 | Betts et al. |
| 4,684,687 A | 8/1987 | Breach et al. |
| 4,830,014 A | 5/1989 | Goodman et al. |
| 4,880,304 A | 11/1989 | Jaeb et al. |
| 5,135,220 A | 8/1992 | Baldoni |
| 6,097,480 A | 8/2000 | Kaplan |
| 6,154,658 A | 11/2000 | Caci |
| 6,201,698 B1 | 3/2001 | Hunter |
| 6,560,993 B1 | 5/2003 | Bosque et al. |
| 6,608,562 B1 | 8/2003 | Kimura et al. |
| 6,699,199 B2 | 3/2004 | Asada et al. |
| 6,745,061 B1 | 6/2004 | Hicks et al. |
| 6,792,044 B2 | 9/2004 | Peng et al. |
| 6,800,693 B2 | 10/2004 | Nishihara et al. |
| 6,803,391 B2 | 10/2004 | Paglia et al. |
| 6,805,140 B2 | 10/2004 | Velez, Jr. et al. |
| 6,894,628 B2 | 5/2005 | Marpe et al. |
| 6,909,753 B2 | 6/2005 | Meehan et al. |
| 6,959,116 B2 | 10/2005 | Sezer et al. |
| 7,013,674 B2 | 3/2006 | Kretchmer |
| 7,136,532 B2 | 11/2006 | VanDer |
| 7,190,986 B1 | 3/2007 | Hannula et al. |
| 7,227,894 B2 | 6/2007 | Lin et al. |
| 7,286,710 B2 | 10/2007 | Marpe et al. |
| 7,468,036 B1 | 12/2008 | Rulkov et al. |
| 7,500,746 B1 | 3/2009 | Howell et al. |
| 7,519,229 B2 | 4/2009 | Wallace et al. |
| 7,872,444 B2 | 1/2011 | Hamilton et al. |
| 8,031,172 B2 | 10/2011 | Kruse et al. |
| 8,075,484 B2 | 12/2011 | Moore-Ede |
| 8,345,752 B2 | 1/2013 | Lee et al. |
| 8,446,275 B2 | 5/2013 | Utter, II |
| 8,554,297 B2 | 10/2013 | Moon et al. |
| 8,570,273 B1 | 10/2013 | Smith |
| 8,700,111 B2 | 4/2014 | Leboeuf et al. |
| 8,954,135 B2 | 2/2015 | Yuen et al. |
| 9,218,058 B2 | 12/2015 | Bress et al. |
| 9,248,839 B1 | 2/2016 | Tan |
| 9,248,938 B2 | 2/2016 | Hopps |
| 9,362,775 B1 | 6/2016 | Jacobs |
| 9,420,260 B2 | 8/2016 | McGregor et al. |
| 9,440,657 B1 | 9/2016 | Fields et al. |
| 9,477,146 B2 | 10/2016 | Xu et al. |
| 9,509,170 B2 | 11/2016 | Wu |
| 9,628,707 B2 | 4/2017 | Blum et al. |
| 9,660,488 B2 | 5/2017 | Breedvelt-Schouten et al. |
| 9,696,690 B2 | 7/2017 | Nguyen et al. |
| 9,711,060 B1 | 7/2017 | Lusted et al. |
| 9,711,993 B2 | 7/2017 | Kim |
| 9,717,949 B1 | 8/2017 | Tran et al. |
| 9,756,301 B2 | 9/2017 | Li et al. |
| 9,847,020 B2 | 12/2017 | Davis |
| 9,861,314 B2 | 1/2018 | Haverinen et al. |
| 9,908,530 B1 | 3/2018 | Fields et al. |
| 9,931,976 B1 | 4/2018 | Terwilliger et al. |
| 9,955,286 B2 | 4/2018 | Segal |
| 9,956,963 B2 | 5/2018 | Vijaya Kumar et al. |
| 9,965,761 B2 | 5/2018 | Elangovan et al. |
| 10,007,355 B2 | 6/2018 | Schorsch et al. |
| 10,085,695 B2 | 10/2018 | Ouwerkerk et al. |
| 10,099,608 B2 | 10/2018 | Cuddihy et al. |
| 10,102,510 B2 | 10/2018 | Yau et al. |
| 10,137,777 B2 | 11/2018 | Lu et al. |
| 10,139,859 B2 | 11/2018 | Von Badinski et al. |
| 10,252,016 B2 | 4/2019 | Pedro et al. |
| 10,281,953 B2 | 5/2019 | Von Badinski et al. |
| 10,303,867 B2 | 5/2019 | Schröder |
| 10,315,557 B2 | 6/2019 | Terwilliger et al. |
| 10,317,940 B2 | 6/2019 | Eim et al. |
| 10,359,846 B2 | 7/2019 | Priyantha et al. |
| 10,366,220 B2 | 7/2019 | Shapiro et al. |
| 10,377,386 B2 | 8/2019 | Richmond |
| 10,396,584 B2 | 8/2019 | Madau et al. |
| 10,409,327 B2 | 9/2019 | Stotler |
| 10,444,834 B2 | 10/2019 | Vescovi et al. |
| 10,463,141 B2 | 11/2019 | Fitzgerald et al. |
| 10,528,989 B1 | 1/2020 | Irey |
| 10,629,175 B2 | 4/2020 | Yan et al. |
| 10,664,842 B1 | 5/2020 | Bermudez et al. |
| 10,693,872 B1 | 6/2020 | Larson et al. |
| 10,703,204 B2 | 7/2020 | Hassan et al. |
| 10,745,032 B2 | 8/2020 | Scheggi |
| 10,762,183 B1 | 9/2020 | Charan et al. |
| 10,768,666 B2 | 9/2020 | Von Badinski et al. |
| 10,838,499 B2 | 11/2020 | Wang et al. |
| 10,842,429 B2 | 11/2020 | Kinnunen et al. |
| 10,849,557 B2 | 12/2020 | Keating |
| 10,893,833 B2 | 1/2021 | Haverinen et al. |
| 11,227,060 B1 | 1/2022 | John et al. |
| 11,265,635 B2 | 3/2022 | Shankar |
| 11,312,299 B1 | 4/2022 | Assam |
| 11,479,258 B1 | 10/2022 | Sanchez |
| 11,599,147 B2 | 3/2023 | Von Badinski et al. |
| 11,637,511 B2 | 4/2023 | Sanchez |
| 11,868,178 B2 | 1/2024 | Von Badinski et al. |
| 11,868,179 B2 | 1/2024 | Von Badinski et al. |
| 11,894,704 B2 | 2/2024 | Sanchez |
| 11,909,238 B1 | 2/2024 | Sanchez |
| 11,923,791 B2 | 3/2024 | Sanchez |
| 2002/0042464 A1 | 4/2002 | Barclay et al. |
| 2002/0091568 A1 | 7/2002 | Kraft et al. |
| 2002/0121831 A1 | 9/2002 | Egawa et al. |
| 2003/0077064 A1 | 4/2003 | Katayama |
| 2003/0142065 A1 | 7/2003 | Pahlavan |
| 2004/0090210 A1 | 5/2004 | Becker et al. |
| 2004/0102551 A1 | 5/2004 | Sato et al. |
| 2004/0118592 A1 | 6/2004 | Pehlert |
| 2004/0145256 A1 | 7/2004 | Miekka |
| 2004/0160635 A1 | 8/2004 | Ikeda et al. |
| 2004/0200235 A1 | 10/2004 | Kretchmer |
| 2005/0012648 A1 | 1/2005 | Marpe et al. |
| 2005/0030205 A1 | 2/2005 | Konoshima et al. |
| 2005/0054941 A1 | 3/2005 | Ting et al. |
| 2005/0062454 A1 | 3/2005 | Raghunath et al. |
| 2005/0133248 A1 | 6/2005 | Easter |
| 2005/0162523 A1 | 7/2005 | Darrell et al. |
| 2005/0185060 A1 | 8/2005 | Neven, Sr. |
| 2005/0185843 A1 | 8/2005 | Kudoh |
| 2005/0185844 A1 | 8/2005 | Ono et al. |
| 2005/0230596 A1 | 10/2005 | Howell et al. |
| 2006/0002607 A1 | 1/2006 | Boncyk et al. |

(56) References Cited

U.S. PATENT DOCUMENTS

| | | |
|---|---|---|
| 2006/0069681 A1 | 3/2006 | Lauper |
| 2006/0080286 A1 | 4/2006 | Svendsen |
| 2006/0085477 A1 | 4/2006 | Phillips et al. |
| 2006/0089792 A1 | 4/2006 | Manber et al. |
| 2006/0211924 A1 | 9/2006 | Dalke et al. |
| 2006/0250043 A1 | 11/2006 | Chung |
| 2006/0271593 A1 | 11/2006 | De Mes et al. |
| 2007/0149222 A1 | 6/2007 | Hodko et al. |
| 2007/0159522 A1 | 7/2007 | Neven |
| 2007/0188626 A1 | 8/2007 | Squilla et al. |
| 2007/0200713 A1 | 8/2007 | Weber et al. |
| 2007/0223826 A1 | 9/2007 | Ridge et al. |
| 2008/0068559 A1 | 3/2008 | Howell et al. |
| 2008/0136587 A1 | 6/2008 | Orr |
| 2008/0174676 A1 | 7/2008 | Squilla et al. |
| 2008/0218684 A1 | 9/2008 | Howell et al. |
| 2008/0275309 A1 | 11/2008 | Stivoric et al. |
| 2009/0056703 A1 | 3/2009 | Mills et al. |
| 2010/0219989 A1 | 9/2010 | Asami et al. |
| 2011/0007035 A1 | 1/2011 | Shai |
| 2011/0080339 A1 | 4/2011 | Sun et al. |
| 2011/0224875 A1 | 9/2011 | Cuddihy et al. |
| 2012/0016245 A1 | 1/2012 | Niwa et al. |
| 2012/0130203 A1 | 5/2012 | Stergiou et al. |
| 2012/0184367 A1 | 7/2012 | Parrott et al. |
| 2012/0218184 A1 | 8/2012 | Wissmar |
| 2012/0293107 A1 | 11/2012 | Ajagbe |
| 2012/0317024 A1 | 12/2012 | Rahman et al. |
| 2013/0106603 A1 | 5/2013 | Weast et al. |
| 2013/0211291 A1 | 8/2013 | Tran |
| 2013/0335213 A1 | 12/2013 | Sherony et al. |
| 2014/0091659 A1 | 4/2014 | Suzuki et al. |
| 2014/0107493 A1 | 4/2014 | Yuen et al. |
| 2014/0118704 A1 | 5/2014 | Duelli et al. |
| 2014/0120983 A1 | 5/2014 | Lam |
| 2014/0187160 A1 | 7/2014 | Prencipe |
| 2014/0218529 A1 | 8/2014 | Mahmoud et al. |
| 2014/0238153 A1* | 8/2014 | Wood .................. A43B 23/029 73/862.627 |
| 2014/0240132 A1 | 8/2014 | Bychkov |
| 2014/0244009 A1 | 8/2014 | Mestas |
| 2014/0274203 A1 | 9/2014 | Ganong, III et al. |
| 2014/0309849 A1 | 10/2014 | Ricci |
| 2014/0361934 A1 | 12/2014 | Ely et al. |
| 2014/0361945 A1 | 12/2014 | Misra et al. |
| 2015/0003693 A1 | 1/2015 | Baca et al. |
| 2015/0019266 A1 | 1/2015 | Stempora |
| 2015/0028996 A1 | 1/2015 | Agrafioti et al. |
| 2015/0046996 A1 | 2/2015 | Slaby et al. |
| 2015/0062086 A1 | 3/2015 | Nattukallingal |
| 2015/0065090 A1 | 3/2015 | Yeh |
| 2015/0098309 A1 | 4/2015 | Adams |
| 2015/0124096 A1 | 5/2015 | Koravadi |
| 2015/0126824 A1 | 5/2015 | Leboeuf et al. |
| 2015/0158499 A1 | 6/2015 | Koravadi |
| 2015/0220109 A1 | 8/2015 | Von et al. |
| 2015/0277559 A1 | 10/2015 | Vescovi et al. |
| 2015/0338926 A1 | 11/2015 | Park et al. |
| 2015/0352953 A1 | 12/2015 | Koravadi |
| 2016/0028267 A1 | 1/2016 | Lee et al. |
| 2016/0098530 A1 | 4/2016 | Dill et al. |
| 2016/0189149 A1 | 6/2016 | MacLaurin et al. |
| 2016/0207454 A1 | 7/2016 | Cuddihy |
| 2016/0226313 A1 | 8/2016 | Okubo |
| 2016/0236692 A1 | 8/2016 | Kleen et al. |
| 2016/0292563 A1 | 10/2016 | Park |
| 2016/0317060 A1 | 11/2016 | Connor |
| 2016/0334901 A1 | 11/2016 | Rihn |
| 2016/0336758 A1* | 11/2016 | Breedvelt-Schouten ................... H02J 7/0044 |
| 2016/0361032 A1 | 12/2016 | Carter et al. |
| 2017/0010677 A1 | 1/2017 | Roh et al. |
| 2017/0012925 A1 | 1/2017 | Tekin et al. |
| 2017/0024008 A1 | 1/2017 | Kienzle et al. |
| 2017/0026790 A1 | 1/2017 | Flitsch et al. |
| 2017/0042477 A1 | 2/2017 | Haverinen et al. |
| 2017/0053461 A1 | 2/2017 | Pal et al. |
| 2017/0057492 A1 | 3/2017 | Eddington et al. |
| 2017/0070078 A1 | 3/2017 | Hwang et al. |
| 2017/0075701 A1 | 3/2017 | Ricci et al. |
| 2017/0080952 A1 | 3/2017 | Gupta et al. |
| 2017/0090475 A1 | 3/2017 | Choi et al. |
| 2017/0109512 A1 | 4/2017 | Bower et al. |
| 2017/0129335 A1 | 5/2017 | Lu et al. |
| 2017/0131772 A1 | 5/2017 | Choi |
| 2017/0190121 A1* | 7/2017 | Aggarwal .............. A43D 1/025 |
| 2017/0192530 A1 | 7/2017 | Lee |
| 2017/0242428 A1 | 8/2017 | Pal et al. |
| 2017/0251967 A1 | 9/2017 | Premsukh |
| 2017/0336964 A1 | 11/2017 | Kim et al. |
| 2017/0346635 A1 | 11/2017 | Gummeson et al. |
| 2017/0347895 A1 | 12/2017 | Wei et al. |
| 2017/0374074 A1 | 12/2017 | Stuntebeck |
| 2018/0025351 A1 | 1/2018 | Chen et al. |
| 2018/0025430 A1 | 1/2018 | Perl et al. |
| 2018/0032126 A1 | 2/2018 | Liu |
| 2018/0037228 A1 | 2/2018 | Biondo et al. |
| 2018/0039303 A1 | 2/2018 | Hashimoto et al. |
| 2018/0052428 A1 | 2/2018 | Abramov |
| 2018/0054513 A1 | 2/2018 | Ma |
| 2018/0068105 A1 | 3/2018 | Shapiro et al. |
| 2018/0093606 A1 | 4/2018 | Terwilliger et al. |
| 2018/0093672 A1 | 4/2018 | Terwilliger et al. |
| 2018/0115797 A1 | 4/2018 | Wexler et al. |
| 2018/0120891 A1 | 5/2018 | Eim et al. |
| 2018/0120892 A1 | 5/2018 | Von Badinski et al. |
| 2018/0123629 A1 | 5/2018 | Wetzig |
| 2018/0167200 A1 | 6/2018 | High et al. |
| 2018/0174457 A1 | 6/2018 | Taylor |
| 2018/0178712 A1 | 6/2018 | Terwilliger et al. |
| 2018/0256027 A1 | 9/2018 | Lacher |
| 2018/0257668 A1 | 9/2018 | Tonshal |
| 2018/0292901 A1 | 10/2018 | Priyantha et al. |
| 2018/0300467 A1 | 10/2018 | Kwong et al. |
| 2018/0322957 A1 | 11/2018 | Dill et al. |
| 2019/0049267 A1 | 2/2019 | Huang |
| 2019/0083022 A1 | 3/2019 | Huang |
| 2019/0131812 A1 | 5/2019 | Lee et al. |
| 2019/0155104 A1 | 5/2019 | Li et al. |
| 2019/0155385 A1* | 5/2019 | Lim ....................... G06F 3/033 |
| 2019/0172289 A1 | 6/2019 | O'Toole et al. |
| 2019/0191998 A1 | 6/2019 | Heikenfeld et al. |
| 2019/0230507 A1 | 7/2019 | Li et al. |
| 2019/0265868 A1 | 8/2019 | Penilla et al. |
| 2019/0286805 A1 | 9/2019 | Law et al. |
| 2019/0287083 A1 | 9/2019 | Wurmfeld et al. |
| 2019/0295440 A1 | 9/2019 | Hadad |
| 2019/0298173 A1 | 10/2019 | Lawrence et al. |
| 2019/0298265 A1 | 10/2019 | Keating et al. |
| 2019/0332140 A1 | 10/2019 | Wang et al. |
| 2019/0342329 A1 | 11/2019 | Turgeman |
| 2019/0357834 A1 | 11/2019 | Aarts et al. |
| 2020/0001895 A1 | 1/2020 | Scheggi |
| 2020/0005791 A1 | 1/2020 | Rakshit et al. |
| 2020/0070840 A1 | 3/2020 | Gunaratne |
| 2020/0142497 A1 | 5/2020 | Zhu |
| 2020/0218238 A1 | 7/2020 | Wang |
| 2020/0356652 A1 | 11/2020 | Yamaguchi et al. |
| 2020/0391696 A1 | 12/2020 | Kato et al. |
| 2021/0019731 A1 | 1/2021 | Rule et al. |
| 2021/0029112 A1 | 1/2021 | Palle et al. |
| 2021/0058692 A1 | 2/2021 | Shankar |
| 2021/0197849 A1 | 7/2021 | Tsuji |
| 2021/0382684 A1 | 12/2021 | Hachiya et al. |
| 2022/0083149 A1 | 3/2022 | Keller et al. |
| 2022/0320899 A1 | 10/2022 | Sanchez et al. |
| 2023/0027131 A1 | 1/2023 | Sanchez et al. |

FOREIGN PATENT DOCUMENTS

| | | |
|---|---|---|
| CN | 105960196 | 9/2016 |
| CN | 106360895 | 2/2017 |
| CN | 206213423 U | 6/2017 |
| CN | 206333477 | 7/2017 |

(56) References Cited

FOREIGN PATENT DOCUMENTS

| | | |
|---|---|---|
| CN | 206371611 | 8/2017 |
| CN | 107139933 | 9/2017 |
| CN | 107260139 | 10/2017 |
| CN | 105841851 A | 8/2018 |
| CN | 108900691 | 11/2018 |
| CN | 108926081 A | 12/2018 |
| DE | 10201301233399 | 7/2013 |
| DE | 102015006677 | 11/2016 |
| DE | 102019116618 A1 | 12/2020 |
| EP | 1223191 A1 | 7/2002 |
| EP | 1384752 A1 | 1/2004 |
| EP | 2281205 A1 | 2/2011 |
| EP | 2581856 | 4/2013 |
| JP | 200879676 | 4/2008 |
| KR | 20110012229 | 2/2011 |
| KR | 20170013067 | 2/2017 |
| KR | 20170087113 A | 7/2017 |
| KR | 101835991 B1 | 4/2018 |
| WO | 2001017421 | 3/2001 |
| WO | 2005114476 A1 | 12/2005 |
| WO | 2005124594 A1 | 12/2005 |
| WO | 2008008714 A1 | 1/2008 |
| WO | 2011132009 A2 | 10/2011 |
| WO | 2015077418 | 5/2015 |
| WO | 2017136940 A1 | 8/2017 |
| WO | 2018000396 | 1/2018 |
| WO | 2018154341 A1 | 8/2018 |
| WO | 2018164632 | 9/2018 |
| WO | 2018204811 | 11/2018 |
| WO | 2019082095 | 5/2019 |
| WO | 2019140528 | 7/2019 |
| WO | 2019180626 | 9/2019 |

OTHER PUBLICATIONS https://en.wikipedia.org/w/index.php?title=Ring_size&oldid=891328817 2019.

Mario, https://www.smartringnews.com/posts/smart-ring-vs-smartwatch-which-is-the-best-fitness-and-activity-tracker 2014.

Laput et al., "Skin buttons: cheap, small, low-powered and clickable fixed-icon laser projectors," UIST '14: Proceedings of the 27th Annual ACM Symposium on User Interface Software and Technology, pp. 389-394 Oct. 2014.

"How to find your ideal bedtime with the Oura app", available online at <https://web_archive.org/web/20191206205332/https://ouraring.com/how-to-find-your-ideal-bedtime-with-the-oura-app/ 2019, 8 pages. 2019.

"Vauxhall/Opel In-Car Wireless Charging", retrieved from <https://www.air-charge.com/aircharge-for-business/automotive/vauxhall-wireless- charging>, Oct. 2019, 4 pages. Oct. 2019.

"Wireless charging for smart ring/pointing devices" available online at <http://www.humavox.comismt_product/wireless-charging-for-smart-ringpointing-devices/>, Oct. 2019, 3 pages Oct. 2019.

ASU projection wearable: Live tomorrow today (world first launch @ CES 2016). (Dec. 2015). ASU Tech, YouTube. Retrieved from https://www.youtube.com/watch?v=Wdb5O-D7Y0Y Dec. 2016.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printingt, Sep. 6, 2017, pp. 11 Sep. 6, 2017.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61 Jan. 2015.

Charles Q. Choi, "Low Battery? New Tech Lets You Wirelessly Share Power", available online at <https://www_livescience.com/54790-new-tech-enables-wireless-charging_html>, May 19, 2016, 9 pages May 19, 2016.

Chen, X. A_, et al., "Encore: 3D printed augmentation of everyday objects with printed-over, affixed and interlocked attachments," Nov. 5, 2015, pp. 73-82 Nov. 5, 2015.

Chen, X. A_, et al., "Reprise: A design tool for specifying, generating, and customizing 3D printable adaptations on everyday objects," Oct. 16, 2016, pp. 29-39 Oct. 16, 2016.

E-Senses, "Personal vitamin D, sunlight and daylight coach", available online at <https://e-senses.com/>, 2019, 5 pages 2019.

Hipolite, W., "The 3D printed 0 Bluetooth Ring is one of the tiniest personal computers you will ever see," 3DPrint.com. Retrieved from https://3dprint.com/34627/o-bluetooth-ring-3d-printed/, Jan. 2015, pp. 5 Jan. 2015.

Hussain Almossawi, "This smart ring aims to provide better lives for people with sickle cell disease", retrieved from <Dhttps://www.core77.com/projects/82131/This-Smart-Ring-Aims-to-Provide-Better-Lives-for-People-with-Sickle-Cell-2021, 9 pages 2021.

Je et al., "PokeRing: Notifications by poking around the finger", Proceedings of the 2018 CHI Conference on Human Factors in Computing Systems—CHI'18, 2018, paper 542, pp. 1-10 2018.

Katharine Schwab, "Orii, the ring that turns your finger into a phone, is here", available online at <https://www_fastcompany_com/90399237/orii-the-ring-that-turns-your-finger-into-a-phone-is-here >, 2019, 4 pages 2019.

Magno et al., "Self-sustainable smart ring for long-term monitoring of blood oxygenation", IEEE Access, 2019, pp. 115400-115408 2019.

Mahmud et al., Wearable technology for drug abuse detection: A survey of recent advancements, Smart Health, vol. 13, Aug. 2019, 100062 Aug. 2019.

Margaret, "The Orb: A Bluetooth headset that turns into a ring", Gadgets, BornRich, Jun. 2013, available online at <http://www.bomrich.com/the-orb-a-bluetooth-headset-that-turns-into-a-ring_html > Jun. 2013.

Nassi et al., "Virtual breathalyzer", Department of Software and Information Systems Engineering, Ben-Gurion University of the Negev, Israel, 2016, 10 pages 2016.

Neev Kiran, "SkinnySensor: Enabling Battery-Less Wearable Sensors via Intrabody Power Transfer", Masters Theses 694, University of Massachusetts Amherst, 2018, 63 pages 2018.

Nerd-Fu, "Push present", Delicious Juice Dot Com, Apr. 2015, available online at < https://blog_deliciousjuice_com/2015/04/ > Apr. 2015.

Pablo E SuArez, "NXT Ring—Your Digital-self at Hand", available online at <https://www_youtube.com/watch?v=9w7uxDHs7NY>, uploaded on Jun. 21, 2019, 2 pages Jun. 21, 2019.

Roumen et al., "NotiRing: A comparative study of notification channels for wearable interactive rings", Proceedings of the 33rd Annual ACM Conference on Human Factors in Computing Systems—CHI'15, 2015, pp. 2497-2500 2015.

Sarah Jacobsson Purewal, "Ringly review: The smart ring that could be sexier", available online at <https://www_macworld_com/article/227133/ringly-review-the-smart-ring-that-could-be-sexier.html>, 2016, 10 pages 2016.

Schwab, K, "This startup wants to kill passwords-and replace them with jewelry. Fast Company," Retrieved from https://www.fastcompany.com/90254843/this-startup-wants-to-kill-passwords-and-replace-them-with-jewelry, (Oct. 2018), pp. 7 Oct. 2018.

Seung et al., "Nanopatterned Textile-Based Wearable Triboelectric Nanogenerator", ACS Nano, vol. 9, 2015, pp. 3501-3509 2015.

Shane McGlaun, "Geek builds Bluetooth Smart Ring with OLED display", available online at <https://www_slashgear.com/geek-builds-bluetooth-smart-ring-with-oled-display-02361383/>, 2015, 6 pages 2015.

Sperlazza, e tested four sleep tracker apps and wearables: Here are the best ones, available online at <https://www_bulletproof_com/sleep/tech/best-sleep-tracker-apps/>, 2019, 18 pages 2019.

Turunen, "Smart ring for stress control and self-understanding", available online at <https://slowfinland.fi/en/smart-ring-for-stress-control-and-self-understanding/>, 2017, 9 pages 2017.

Woochit Tech (2017). New smart ring monitors UV exposure [video file]. Retrieved from https://www.youtube.com/watch?v=4YvkioTZxjU, 3 pgs 2017.

Worgan et al., "Garment level power distribution for wearables using inductive power transfer," 9th International Conference on Human System Interactions (HSI), 2016, pp. 277-283 2016.

(56) References Cited

OTHER PUBLICATIONS

Xiao et al., "LumiWatch: On-arm projected graphics and touch input," Proceedings of the 2018 CHI Conference on Human Factors in Computing Systems—CHI'18, 2018, pp. 1-11 2018.

Zhu et al., "Developing a driving fatigue detection system using physiological sensors," Proceedings of the 29th Australian Conference on Computer-Human Interaction—OZCHI'17, 2017, pp. 566-570 2017.

Zhu, M., et al., "Fluidic fabric muscle sheets for wearable and soft robotics," Retrieved from https://arxiv.org/pdf/1903.08253.pdf, Mar. 2019, pp. 32 Mar. 2019.

"The Oura App | Oura Ring", available online at <https://web.archive.org/web/20191019192921/https://ouraring.com/introducing-the-new-oura-app/>, 6 pages Oct. 29, 2019.

"Get the Technical Specs of Oura Ring | Oura Ring", available online at <https://web.archive.org/web/2019129014439/https://ouraring.com/tech-specs/>, 3 pages Jan. 29, 2019.

"Learn how the Oura ring works | Go inside | Oura Ring", available online at <https://web.archive.org/web/20181127193557/https://ouraring.com/how-oura-works/>, 5 pages Nov. 27, 2018.

Oura Ring Generation 1 User Manual, available online at < https://fccid.io/2AD7V-OURARING15001/User-Manual/User-Manual-2844448.pdf>, 8 pages Nov. 24, 2015.

Oura Ring Generation 2 User Manual, available online at < https://fccid.io/2AD7V-OURA1801/User-Manual/User-manual-v2-3856414.pdf>, 13 pages Mar. 27, 2018.

Oura ring. Improve sleep. Perform better. by Oura—Kickstarter, available online at <https://web.archive.org/web/20160427015852/https://www.kickstarter.com/projects/oura/oura-ring-improve-sleep-perform-better/description>, 27 pages Apr. 27, 2016.

Oura Ring review—The Gadgeteer, available online at < https://the-gadgeteer.com/2017/08/11/oura-ring-review/> 16 pages Aug. 11, 2017.

Ouraring.com JZ50-0112 user manual available with Gen 2 ring purchase, 2 pages.

Important Information Please Read JZ50-0148 user manual available with gen 2 ring purchase, 4 pages May 13, 2019.

Important Information Please Read JZ50-0149 user manual available with gen 2 ring purchase, 4 pages May 13, 2019.

Oura Ring | Sleep Tracker and Smart Ring with a Heart Rate Monitor, available online at <https://web.archive.org/web/20180709050831/https://ouraring.com/>, 12 pages Jul. 9, 2018.

Introducing the New Oura Ring Generation 3—The Pulse Blog, available online at <https://ouraring.com/blog/oura-generation2-vs-generation3/>, 3 pages Oct. 26, 2021.

Oura Ring 2 Teardown: Inside the NBA's COVID-19-Detecting Smart Ring, available at < https://www.youtube.com/watch?v=BwA1hmSVgVY> (Script) Jul. 9, 2020.

Oura Ring 2 Teardown: Inside the NBA's COVID-19-Detecting Smart Ring, available at < https://www.youtube.com/watch?v=BwA1hmSVgVY> (Screenshots) Jul. 9, 2020.

Rhee et al., (2000). Artifact-resistant, power-efficient design of finger-ring plethysmographic sensors. I. Design and analysis. 4. 2792-2795 vol.4. 10.1109/IEMBS.2000.901443. Part I 2000.

Rhee et al., (2000). Artifact-resistant, power-efficient design of finger-ring plethysmographic sensors. II. Prototyping and benchmarking. 4. 2796-2799 vol.4. 10.1109/IEMBS.2000.901444. Part II 2000.

Dynamic drinkware-type analysis for mestas.

Liu et al., (2009). UWave: Accelerometer-based personalized gesture recognition and its applications. Pervasive and Mobile Computing. 5. 657-675. 10.1016/j.pmcj.2009.07.007. 2009.

Trigueiros et al., (2019). A comparison of machine learning algorithms applied to hand gesture recognition. 2019.

Castaneda et al., (2018), Int J Biosens Bioelectron. 2018, "A review on wearable photoplethysmography sensors and their potential future applications in health care"; 4(4): 195-202. doi: 10.15406/ijbsbe.2018.04.00125. 2018.

Mendelson et al., (2006). A Wearable Reflectance Pulse Oximeter for Remote Physiological Monitoring. Conference Proceedings: . . . Annual International Conference of the IEEE Engineering in Medicine and Biology Society. IEEE Engineering in Medicine and Biology Society. Conference. 1. 912-5. 10.1109/IEMBS.2006.260137. 2006.

Smiley, S., (2016). Active RFID vs. Passive RFID: What's the Difference? https://www.atlasrfidstore.com/rfid-insider/active-rfid-vs-passive-rfid/?srsltid=AfmBOoqhNhYwPPUSENIXB8LarZMm3TVQ4ugn4nTNUhfpy-9yYC_j0wdm Mar. 2016.

Amma et al., (2010). Airwriting recognition using wearable motion sensors. ACM International Conference Proceeding Series. 10. 10.1145/1785455.1785465. 2010.

Zhou et al., (2012). Analysis and Selection of Features for Gesture Recognition Based on a Micro Wearable Device. International Journal of Advanced Computer Science and Applications. 3. 10.14569/IJACSA.2012.030101. 2012.

Rhee et al., (2001). Artifact-resistant power-efficient design of finger-ring plethysmographic sensors. IEEE transactions on biomedical engineering. 48. 795-805. 10.1109/10.930904. 2001.

Ying et al., (2007). Automatic Step Detection in the Accelerometer Signal. 10.1007/978-3-540-70994-7_14. 2007.

100 Best Inventions of 2020 Retrieved from: https://time.com/collection/best-inventions-2020/ 2020.

Clark, B. A. "Color in Sunglass Lenses*." Optometry and Vision Science 46 (1969): 825-840. 1969.

Rhee, Sokwoo. (2000). Design and analysis of artifact-resistive finger photoplethysmographic sensors for vital sign monitoring—Thesis 2006.

Webster, J.G., Design of pulse oximeters Webster—Institute of Physics Publishing—2003 2003.

Park et al., (2011). E-gesture: A collaborative architecture for energy-efficient gesture recognition with hand-worn sensor and mobile devices. SenSys 2011—Proceedings of the 9th ACM Conference on Embedded Networked Sensor Systems. 359-360. 10.1145/1999995.2000034. 2011.

Teh et al., (2000). Embedding of electronics within thermoplastic polymers using injection moulding technique. Filtration Industry Analyst. 10-18. 10.1109/IEMT.2000.910703. 2000.

Sakai, Tadamoto. (1993). Encapsulation process for electronic devices using injection molding method. Advances in Polymer Technology. 12. 61-71. 10.1002/adv. 1993.060120106. 1993.

Ardebili et al., (2019). Encapsulation technologies for electronic applications 2019.

Au et al., (2009). Episodic Sampling: Towards Energy-efficient Patient Monitoring with Wearable Sensors. Conference proceedings: . . . Annual International Conference of the IEEE Engineering in Medicine and Biology Society. IEEE Engineering in Medicine and Biology Society. Conference. 2009. 6901-5. 10.1109/IEMBS.2009.5333615. 2009.

Silverman, A. (2002). Fifty Years of Glass-Making. Industrial & Engineering Chemistry. 18. 10.1021/ie50201a004. 2002.

Petropoulos et al., (2012). Flexible PCB-MEMS flow sensor. Procedia Engineering. 47. 236-239. 10.1016/j. proeng.2012.09.127. 2012.

Schlomer et al., (2008). Gesture Recognition with a Wii Controller. First publ. in: Proceedings of the 2nd International Conference on Tangible and Embedded Interaction 2008, Bonn, Germany, Feb. 18-20, 2008, pp. 11-14. 10.1145/1347390.1347395. 2008.

Rekimoto, J. (2001). GestureWrist and GesturePad: unobtrusive wearable interactiondevices. International Symposium on Wearable Computers, Digest of Papers. 21-27. 10.1109/ISWC.2001.962092. 2001.

Guidelines to Enhancing the Heart-Rate Monitoring Performance of Biosensing Wearables https://www.analog.com/en/resources/technical-articles/guidelines-to-enhancing-the-heartrate-monitoring-performance-of-biosensing-wearables.html 2019.

Krzyanowski, J. "How are PCB's made? A Beginner's Guide to the PCB Manufacturing Process" Retrieved from Knowledge zone https://vectorbluehub.com/how-are-pcbs-made 2023.

Ciofu, et al., (2013) Injection and Micro Injection of Polymeric . . . First edition of the International Scientific Conference Modern Technologies in Machine Manufacturing Technology TMCM ISSN 2067-3604, vol. V, No. 1/2013https://modtech.ro/international-journal/vol5no12013/Ciofu_Ciprian_1.pdf 2013.

(56) References Cited

OTHER PUBLICATIONS

Ross, R.J.. (2004). LCP injection molded packages—keys to JEDEC 1 performance. 1807-1811 vol.2. 10.1109/ECTC.2004.1320364. 2004.

Murphy, K. (2012) Machine learning: a probabilistic perspective 2012.

Olofson et al., Machining of titanium alloys—Battelle Memorial Institute, Defense Metals Information Center—1965 1965.

Asada et al., "Mobile monitoring with wearable photoplethysmographic biosensors," in IEEE Engineering in Medicine and Biology Magazine, vol. 22, No. 3, pp. 28-40, May-Jun. 2003, doi: 10.1109/MEMB.2003.1213624 2003.

Chen et al., (2009). Monitoring Human Movements at Home Using Wearable Wireless Sensors. Engineering Faculty Presentations. 2009.

On the Heels of 1 Million Rings Sold, Oura Now Valued at $2.55 Billion https://www.businesswire.com/news/home/20220405006108/en/On-the-Heels-of-1-Million-Rings-Sold-Oura-Now-Valued-at-2.55-Billion#:~:text=SAN%20FRANCISCO%2D%2D(BUSINESS%20WIRE,of%20selling%201%2C000%2C000%20Oura%20Rings. Apr. 2022.

Lister et al., (2018) Optical properties of human skin https://www.spiedigitallibrary.org/journals/journal-of-biomedical-optics/volume-17/issue-9/090901/Optical-properties-of-human-skin/10.1117/1.JBO.17.9.090901.full 2018.

Uchino et al., (2000). Prediction of Optical Properties of Commercial Soda-Lime-Silicate Glasses Containing Iron. Journal of Non-Crystalline Solids. 261. 72-78. 10.1016/S0022-3093(99)00617-1. 2000.

Lawrence et al., (1989) "Pulse Oximetry" Anesthesiology: The journal of the American Society Of Anesthesiologists, Inc. vol. 70 No. 1 1989.

König et al., (1998). Reflectance Pulse Oximetry—Principles and Obstetric Application in the Zurich System. Journal of clinical monitoring and computing. 14. 403-12. 10.1023/A:1009983010772. 1998.

Hill et al., (2024) The Best Smart Ring To Rule Them All Retrieved from: https://www.wired.com/gallery/best-smart-rings/ 2024.

Kaltenbach, F. (2004). Translucent Materials: Glass, Plastics, Metals 2004.

Zhu et al., (2011). Wearable Sensor-Based Hand Gesture and Daily Activity Recognition for Robot-Assisted Living. IEEE Transactions on Systems, Man, and Cybernetics, Part A. 41. 569-573. 10.1109/TSMCA.2010.2093883. 2011.

Stables et al., (2022). Why the Oura Ring Gen 3 was our wearable of the year. Retrieved from: https://www.wareable.com/wearable-tech/why-the-oura-ring-3-was-our-wearable-of-the-year-2022 2022.

Sun et al., (2013). Wireless Power Transfer for Medical Microsystems. 10.1007/978-1-4614-7702-0. 2013.

U.S. Appl. No. 61/768,279 2013.

Lawton, G., Active vs. Passive RFID Tags: Which to Choose, TechTarget, Nov. 7, 2022, retrieved from https://www.techtarget.com/searcherp/tip/Active-vs-passive-RFID-tags-Which-to-choose on Aug. 29, 2024.

* cited by examiner

SOFT SMART RING AND METHOD OF MANUFACTURE

CROSS-REFERENCES TO RELATED APPLICATIONS

This application is a continuation of U.S. Non-Provisional patent application Ser. No. 16/927,394, filed on Jul. 13, 2020, which application claims priority to U.S. Provisional Patent Application No. 62/877,391, filed Jul. 23, 2019, and U.S. Provisional Patent Application No. 62/988,065, filed Mar. 11, 2020, all of which are incorporated by reference herein for all purposes.

FIELD OF THE DISCLOSURE

The present disclosure generally relates to implementations of smart ring wearable devices.

BACKGROUND

To the extent that smart ring technology has been adopted, it has a number of challenges. Problems with wearable rings include: they generally need to be removed for charging; they have poor fit; they provide relatively little interactivity; and they provide limited functionality, in general.

BRIEF SUMMARY

This disclosure describes a number of improvements to smart ring technology. Specifically, this disclosure describes multiple techniques for charging smart rings (including harvesting energy, improving wireless charging, improving battery configurations, and increasing functionality while maintaining substantively low energy consumption).

Further, the described techniques include: techniques for measuring and analyzing biometrics; techniques for enabling a variety of security features using smart rings; techniques for improving smart ring form factors; and techniques for using gesture recognition and improving interactivity of smart rings.

According to one aspect of the present disclosure, a smart ring comprises a body including flexible material, a first part, a second part removably connected to the first part, and a pair of break-away portions disposed within the body separate from the first part and the second part. One or more of a battery, a charging unit, a processor unit, a user input unit, a communication unit, a memory unit, at least one sensor unit, an output unit or a user input unit is disposed in or on one of the first part and the second part. So configured, each of the break-away portions of the pair of break-away portions is removable from the other break-away portion upon movement of one break-away portion in a direction away from the other break-away portion.

According to another aspect of the present disclosure, a method of manufacturing a smart ring comprises creating a first part of a body with a flexible material by one of heat molding, stamping, chemical or laser etching, injection molding, ink printing, metal forming, machining or additive manufacturing, and creating a second part of the body with a flexible material by one of heat molding, stamping, chemical or laser etching, injection molding, ink printing, metal forming, machining or additive manufacturing and coupling the second part of the body to the first part of the body. The method also includes providing a pair of magnetic break-away portions separate from the first part and the second part and coupling the pair of magnetic break-away portions to one or more of the first body part and the second body part, such that the pair of magnetic break-away portions couple the second part of the body to the first part of the body. The method still further includes disposing one or more of a battery, a charging unit, a processor unit, a user input unit, a communication unit, a memory unit, at least one sensor unit, an output unit or a user input unit disposed in or on one of the first part of the body, the second part of the body, or a housing coupled to the body.

According to yet another aspect of the present disclosure, a system for additively manufacturing a smart ring comprises a communication network, and a scanning device communicatively coupled to the communication network. The scanning device includes a memory and at least one processor, at least one processor of the scanning device executing a scanning module stored on the memory of the scanning device to create a user-specific scan. The system further comprises a 3D printer communicatively coupled to the communication network, and a design system having a computing device communicatively coupled to the communication network, the scanning device, and the 3D printer. The computing device of the design system may have a memory, at least one processor, a transmitter, and a receiver. The computing device may receive data from the scanning device relating to the user-specific scan. A module is stored in the memory of the computing device of the design system and executable by the at least one processor of the computing device of the design system to: (1) receive data from the scanning device relating to the user-specific scan; and (2) create a user-specific smart ring profile based at least in part on the data received from the scanning device, the user-specific smart ring profile adapted to be transmitted to the 3D printer to implement the user-specific smart ring profile. So configured, the scanning device creates the user-specific scan and the 3D printer receives the user-specific smart ring profile from the computing device of the design center and implements the user-specific smart ring profile to additively manufacture a smart ring comprising a body including flexible material, a first part, a second part removably connected to the first part, and a pair of break-away portions disposed in the body separate from the first part and the second part.

In further accordance with any one or more of the exemplary aspects, the method of manufacturing a smart ring, the system for additively manufacturing a smart ring or any other method or system of the present disclosure may include any one or more of the following preferred forms and/or methods.

According to one form, the body of the smart ring may comprise an inside surface adapted to contact a finger of a user during use. The inside surface may have one or more of at least one sensor or at least one output element.

According to another form, one or more of a portion of the body or the entire body may comprise an electric sensor fabric material.

According to yet another form, a portion of the body may include a silicone material adapted to function as part of one of an artificial muscle or a nerve. The silicone material may be configured to one or more of generating electricity or sensing pressure.

In another form, the body may further comprise an outside surface having one or more of at least one sensor or at least one output element.

In yet another form, the pair of break-away portions may comprise a pair of magnetic break-away portions, and the magnetic break-away portions may include a first magnetic break-away portion and a second magnetic break-away portion disposed adjacent to and in contact with each other. The first magnetic break-away portion may be attached to the first body and include a magnet. The second magnetic break-away portion may be attached to the second part and include a magnet. The magnets may secure the first and second magnetic break-away portions and be removable from each other upon movement of the first magnetic break-away portion in a direction away from the second magnetic break-away portion.

In still another form, the body may be one or more of additively manufactured, injection molded, stamped, ink printed, metal formed, machined or heat molded to a user's dimensions obtained by one or more of scanning or photographing a portion of the user's hand or a mold indicative of a user's finger dimensions, for example In another form, the smart ring may further comprise a housing, wherein one or more of the battery, the charging unit, the processing unit, the user input unit, the communication unit, the memory unit, the at least one sensor unit, and the output unit may be disposed within the housing, and the body may be coupled to the housing.

According to another form, the smart ring may further comprise an output device separate from and coupled to the body. The output device may include one or more of an LCD display, an OLED display, e-ink displays, one or more LED pixels, or a speaker.

In still another form, the first part of the body may be a front part of the body including one recess, and the second part of the body may be a rear part of the body including one tab adapted to be disposed within the at least one recess when the first body part and the second body part are connected to each other. In addition, the first magnetic break-away portion may be disposed adjacent to the recess and the second magnetic break-away portion may be disposed on or attached to the tab. So configured, the first and second magnetic break-away portions may be adjacent to each other when the at least one tab is disposed within the at least one recess.

In yet another form, the first part of the body may be a top body part, and the second part of the body may be a bottom body part. Further, the first magnetic break-away portion may be attached to the top body part, and the second magnetic break-away portion may be attached to the bottom body part. So configured, the first and second magnetic break-away portions may be adjacent to and in contact with each other when the bottom body part is connected to the top body part.

According to yet another example, the method may further comprise coupling a housing to the additively manufactured body of the smart ring, the housing including one or more of a battery, a charging unit, a processor unit, a user input unit, a communication unit, a memory unit, at least one sensor unit, an output unit or a user input unit disposed in or on the body.

In another example, the method may comprise disposing one or more of at least one sensor or an output element on an inside surface of the body.

In yet another exemplary method, the method may further comprise disposing one or more of at least one sensor or an output element on an outside surface of the body.

In another example, the method may further comprise disposing an output device separate from the body on a portion of the body of the smart ring.

In another form, the scanning device may further comprise a transmitter and a receiver. The transmitter may transmit the scanning data to the computing device of the design center.

In yet another form, the 3D printer may have a memory, at least one processor, a transmitter and a receiver. The receiver of the 3D printer may receive the user-specific smart ring profile from the computing device of the design center. The at least one processor of the 3D printer may execute the user-specific smart ring profile to additively manufacture the body of the smart ring.

In another form, the scanning device may include a volumetric capture sensor.

In another embodiment, a smart ring includes a body. The body includes a first part including at least a part of a sensor unit. The body also can include a second part including at least a part of an output unit and removably connected to the first part of the body. The body can further include a first pair of removable portions. The first pair of removable portions can include a first removable portion connected to the first part of the body. The first pair of removable portions also can include a second removable portion connected to the second part of the body. The first removable portion can be removable from the body. The second removable portion can be removable from the body.

In another embodiment, a method of manufacturing a smart ring includes creating a first part of a body. The first part of the body can include at least a part of a sensor unit. The method of manufacturing a smart ring also can include creating a second part of the body that is removably connected to the first part of the body. The second part of the body can include at least a part of an output unit. The method of manufacturing a smart ring further can include providing a first pair of removable portions. The first pair of removable portions can include a first removable portion connected to the first part of the body. The first pair of removable portions further can include a second removable portion connected to the second part of the body. The first removable portion can be removable from the body. The second removable portion can be removable from the body.

In another embodiment, a system for additively manufacturing a smart ring can include a communication network. The system for additively manufacturing a smart ring also can include a scanning device communicatively coupled to the communication network. The scanning device can include a non-volatile memory configured to store a scanning module. The scanning device also can include at least one processor configured to execute the scanning module to create a user-specific scan. The system for additively manufacturing a smart ring further can include a computing device communicatively coupled to the communication network, wherein when a module stored in a non-volatile memory of the computing device is executed by at least one processor of the computing device. The computing device can be configured to receive data from the scanning device relating to the user-specific scan. The computing device also can be configured to create a user-specific smart ring profile based at least in part on the data received from the scanning device. The user-specific smart ring profile can be adapted to be transmitted to a 3D printer to implement the user-specific smart ring profile. The 3D printer can be configured to receive the user-specific smart ring profile from the computing device and implement the user-specific smart ring profile to additively manufacture a smart ring. The user-specific smart ring profile can include a body including a first part. The body of the user-specific smart ring profile also can include a second part removably connected to the first part of the body. The user-specific smart ring profile further can include a first pair of removable portions. The first part of the body can include at least a part of a sensor unit. The second part of the body can include at least a part of an output unit.

In another embodiment, a smart ring includes a body. The body can include a first part including at least a part of a sensor unit. The body also can include a second part removably connected to the first part of the body and including at least a part of an output unit. The body further can include a means for removably connecting the first part of the body to the second part of the body. The means for removably connecting the first part of the body to the second part of the body can include a first portion connected to the first part of the body and a second portion connected to the second part of the body. The first portion of the means for removably connecting the first part of the body to the second part of the body can be removable from the first and second parts of the body. The second portion of the means for removably connecting the first part of the body to the second part of the body can be removable from the first and second parts of the body.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
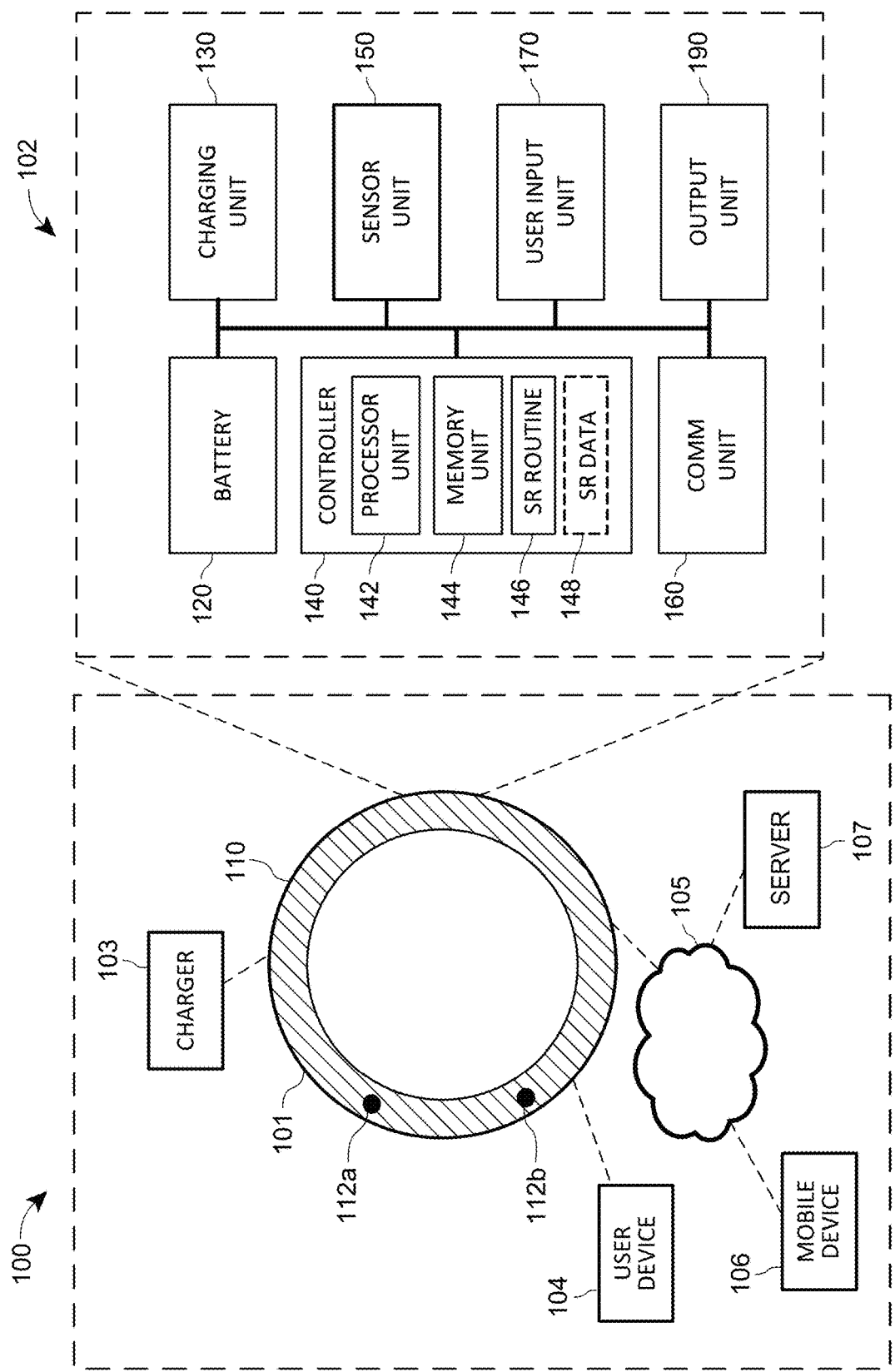
FIG. 1 illustrates a system comprising a smart ring and a block diagram of smart ring components according to some embodiments.

FIG. 1 illustrates a system 100 comprising (i) a smart ring 101 including a set of components 102 and (ii) one or more devices or systems that may be electrically, mechanically, or communicatively connected to the smart ring 101. Specifically, the system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 4.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be configured to delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be configured to delivering higher currents than the energy-conversion cells included in the battery 120. Furthermore, the charge storage device may maintain voltage available to the components or subsystems 130-190 when one or more cells of the battery 120 are removed to be subsequently replaced by other cells.

The charging unit 130 may be configured to replenish the charge supplied by the battery 120 to power-sinking components or subsystems (e.g., one or more of subsystems 130-190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU) or a Micro-controller unit (MCU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be configured to operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor. The sensor unit 150 may include, for example, an inertial motion unit (IMU) for detecting orientation and movement of the ring 101.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiberoptic, twisted-pair, coaxial cable).

User input unit 170 may collect information from a person wearing the ring 101 or another user, configured to interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus 195, which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

Figure 2:
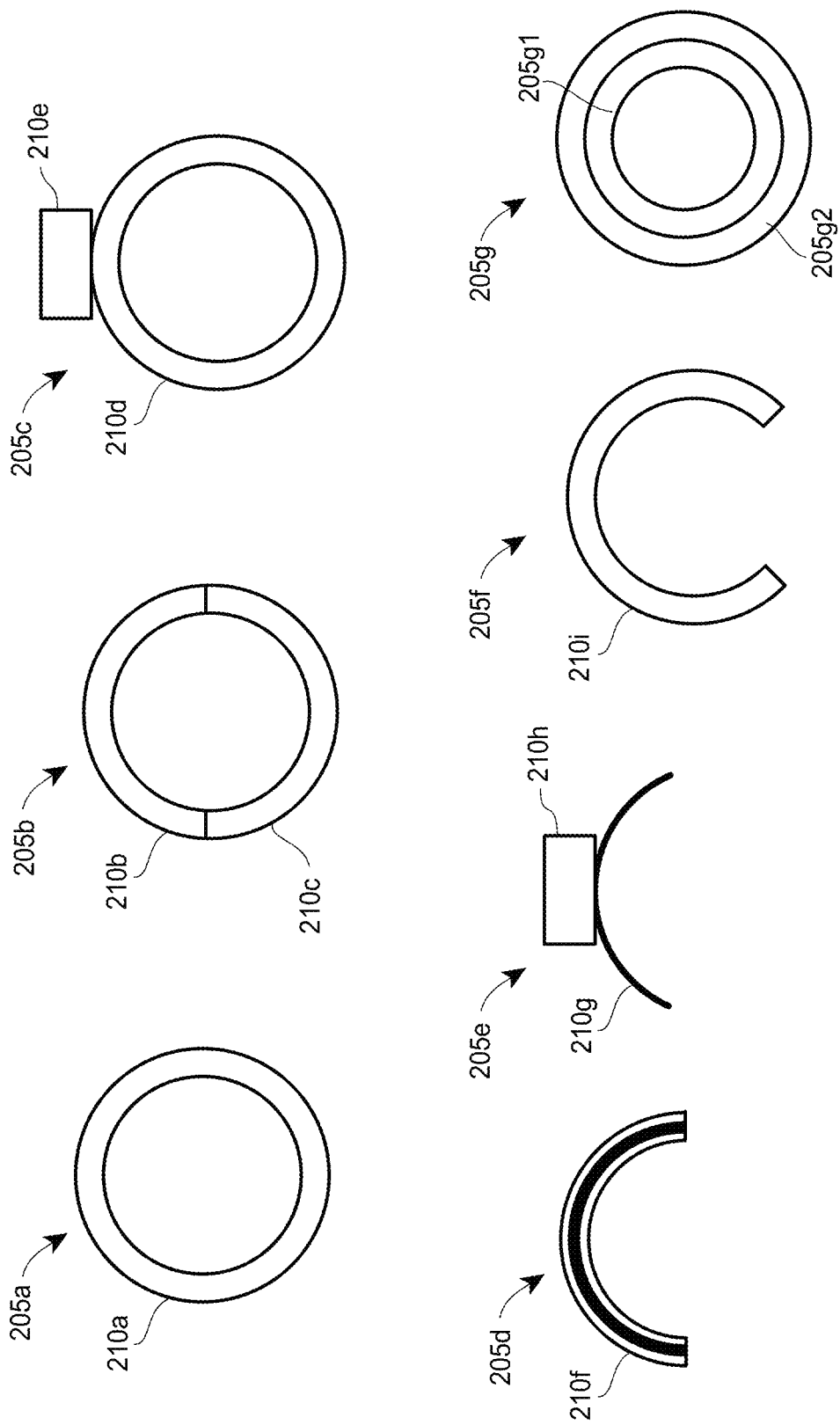
FIG. 2 illustrates a number of different form factor types of a smart ring according to some embodiments.

FIG. 2 includes block diagrams of a number of different example form factor types or configurations 205a, 205b, 205c, 205d, 205e, and/or 205f of a smart ring (e.g., the smart ring 101). The configurations 205a, 205b, 205c, 205d, 205e, and/or 205f (which may also be referred to as the smart rings 205a, 205b, 205c, 205d, 205e, and/or 205f) may each represent an implementation of the smart ring 101, and each may include any one or more of the components 102 (or components similar to the components 102). In some embodiments, one or more of the components 102 may not be included in the configurations 205a, 205b, 205c, 205d, 205e, and/or 205f. The configurations 205a, 205b, 205c, 205d, 205e, and/or 205f include housings 210a-f, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parts 210b and 210c in any suitable manner. The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be configured to being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes that a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

The configuration 205g may be configured to have two rings, a first ring 205g1 configured to and adapted to be mounted onto a finger of a user, and a second ring 205g2 configured to and adapted to be directly mounted onto the first ring 205g1, as depicted in FIG. 2. Said another way, the first ring 205g1 and the second ring 205g2 are arranged in a concentric circle arrangement, such that the second ring 205g2 does not contact a user's finger when the smart ring 205g is worn. Rather, only the first ring 205g1 contacts the user's finger. Each of the first and second rings 205g1 and 205g2 of the smart ring 205g may include a body having flexible material, as explained more below. In addition, the first ring 205g1 may include a first part, and the second ring 205g2 may include a second part removably connected to the first part, as also further described below.

Figure 3:
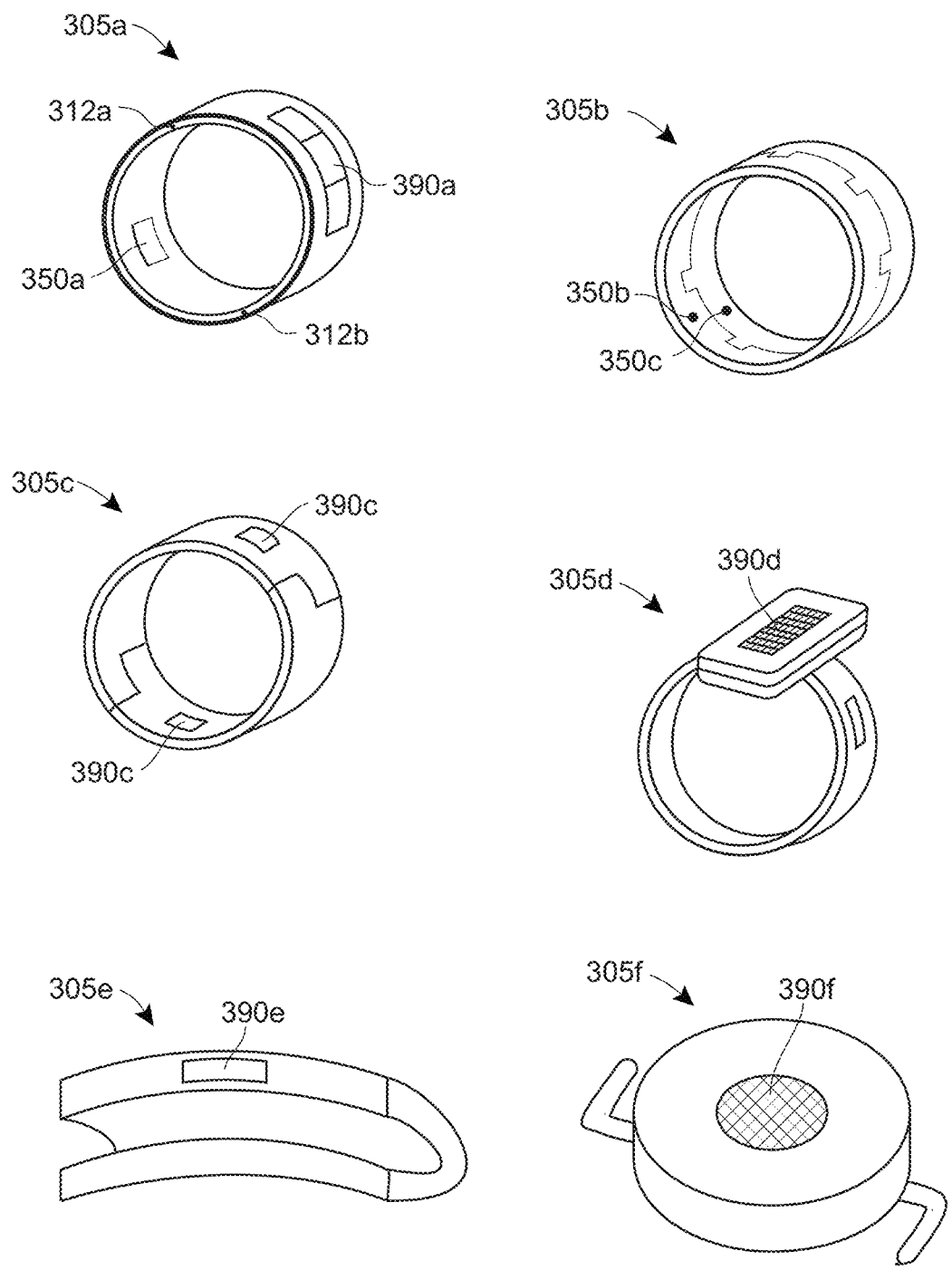
FIG. 3 illustrates examples of different smart ring form factors.

FIG. 3 includes perspective views of example configurations 305a, 305b, 305c, 305d, 305e, and/or 305f of a smart right (e.g., the smart ring 101) in which a number of surface elements are included.

Configuration 305a is an example band configuration 205a of a smart ring (e.g., smart ring 101). Some of the surface elements of the housing may include interfaces 312a, 312b that may be electrically connected to, for example, the charging unit 130 or the communications unit 160. On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

The configurations 305b and 305c are examples of configurations of a smart ring with multiple housing parts (e.g., configuration 205b in FIG. 2). Two (or more) parts may be separate axially (configuration 305b), azimuthally (configuration 305c), or radially (nested rings, not shown). The parts may be connected mechanically, electrically, or optically via, for example, interfaces analogous to interfaces 312a, 312b in configuration 305a. Each part of a smart ring housing may have one or more surface elements, such as, for example, sensors 350b, 350c or output elements 390b, 390c. The latter may be LEDs (e.g., output element 390b) or haptic feedback devices (e.g., output element 390c), among other suitable sensor or output devices. Additionally or alternatively, at least some of the surface elements (e.g., microphones, touch sensors) may belong to the user input unit 170.

Configuration 305d may be an example of a band and platform configuration (e.g., configuration 205c), while configurations 305e and 305f may be examples of the partial ring configurations 205d and 205e, respectively. Output devices 390d, 390e, 390f on the corresponding configurations 305d, 305e, 305f may be LCD display, OLED displays, e-ink displays, one or more LED pixels, speakers, or any other suitable output devices that may be a part of a suite of outputs represented by an output unit (e.g., output unit 190). Other surface elements, such as an interface component 312c may be disposed within, at, or through the housing. It should be appreciated that a variety of suitable surface elements may be disposed at the illustrated configurations 305a, 305b, 305c, 305d, 305e, and/or 305f at largely interchangeable locations. For example, the output elements 390d, 390e, 390f may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

Figure 4:
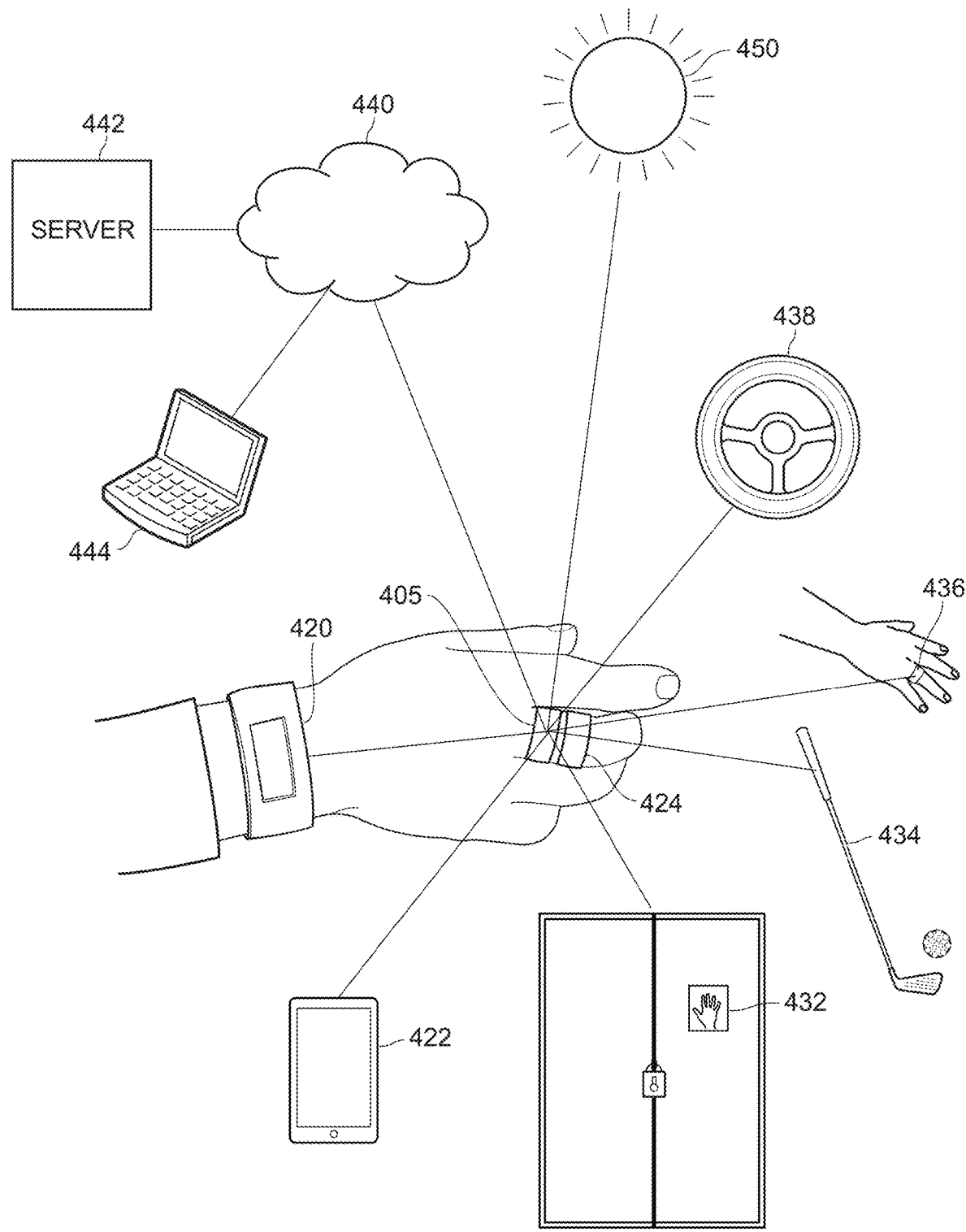
FIG. 4 illustrates an environment within which a smart ring may operate according to some embodiments.

FIG. 4 illustrates an example environment 400 within which a smart ring 405 may be configured to operate. In an embodiment, the smart ring 405 may be the smart ring 101. In some embodiments, the smart ring 405 may be any suitable smart ring configured to providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a, 210b, 210c, 210d, 210e, 210f, 210g, 210h, and/or 210i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

Figure 5A:
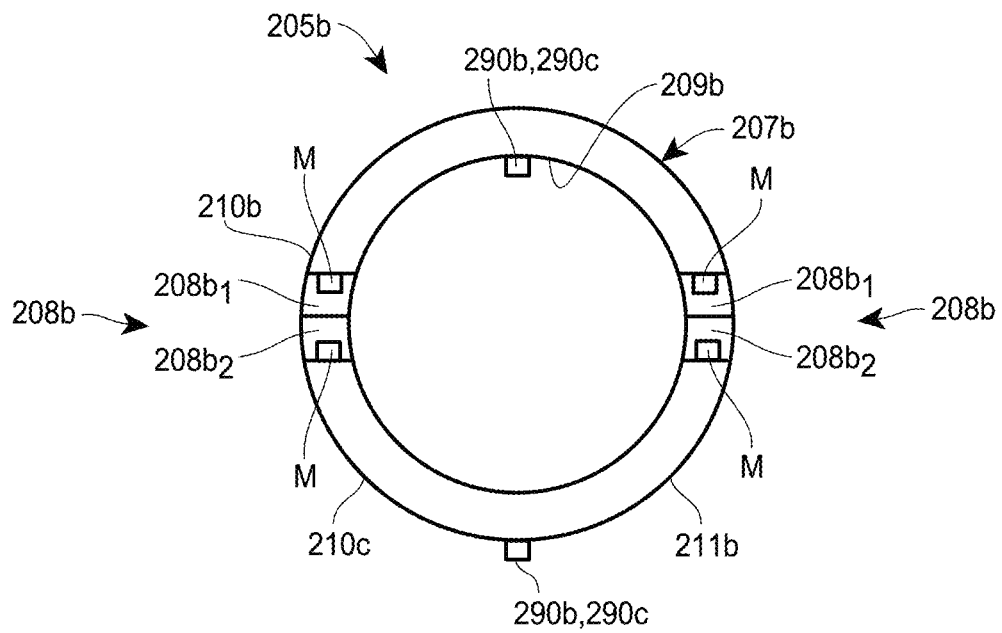
FIG. 5A is a view of a smart ring depicted in FIG. 2 according to some embodiments.

Referring now to FIG. 5A, the smart ring 205b of FIG. 2 is depicted with some additional features. In particular, the smart ring 205b includes a body 207b, such as a housing, having the first part 210b and the second part 210c that is removably connected to the first part 210b. The body 207g may include a flexible material, such as any material configured to bending or conforming to a user's finger, for example. The body 207b further includes one pair of break-away portions 208b disposed within the body 207b adjacent to and separate from the first and second parts 210b, 210c. The at least one pair of break-away portions 210b, 210c are attached to the first and second parts 210b, 210c, respectively, connecting the second part 210c to the first part 210b, as explained more below. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 210b or the second part 210c of the body 207b.

In one example, the at least one pair of break-away portions 208b may include one pair of magnetic break-away portions 208b. The at least one pair of magnetic break-away portions 208b may include a first magnetic break-away portion 208b1 disposed at and/or adjacent to an end of the first part 210b of the body 207b. A second magnetic break-away portion 208b2 is disposed at and/or adjacent to an end of the second part 210c, such that the first and second magnetic break-away portions contact each other to connect the second part 210c to the first part 210b of the body 207b. The first break-away portion 208b1 includes a magnet M and the second magnetic break-away part 208b2 includes a magnet M. The magnets M have opposite polarity and, thus, are attracted to each other to secure the first and second magnetic break-away portions 208b1, 208b2 together when in contact with each other. In addition, the first and second magnetic break-away portions 208b1, 208b2 are removable from each other upon movement of the first break-away portion 208*b*1 in a direction away from the second break-away portion 208*b*2. In another example, the first and second magnetic break-away portions 208*b*1, 208*b*2 are removable from each other upon movement of the first part 210*b* in a direction away from the second part 210*c* because the first part 210*b* is attached to the first break-away magnetic portion 208*b*1 and the second part 210*c* is attached to the second break-away magnetic portion 208*b*2.

In addition, the body 207*b* of the smart ring 205*b* further includes an inside surface 209*b* adapted to contact a finger of a user during use of the smart ring 205*b*. The inside surface 209*b* may include one or more of at least one sensor 290*b* or an output element 290*c*. While the at least one sensor 290*b* or the at least one output element 290*c* are depicted in FIG. 5 as extending from the inside surface 209*b* of the smart ring 205*b*, the at least one sensor 290*b* and the at least one output element 290*c* may additionally and/or alternatively be disposed directly on the inside surface 209*b*, but not extend from the inside surface 209*b*.

Further, the body 207*b* also includes an outside surface 211*b*. In a similar manner, the outside surface 211*b* may include one or more of the at least one sensor 290*b* or the output element 290*c*, for example, extending from the outside surface 211*b*. Alternatively, the at least one sensor 290*b* or the at least one output element 290*c* may not extend from the outside surface 211*b*, but instead be directly disposed thereon in the same plane, for example, as the outside surface 211*b*, such that no part of the at least one sensor 290*b* or the at least one output element 290*c* extends from the outside surface 211*b*.

Still further, the smart ring 205*b* may include more than one pair of magnetic break-away portions 208*b* and still fall within the scope of the present disclosure. For example, and as depicted in FIG. 5, the smart ring 205*b* includes two pairs of magnetic break-away portions 208*b*. A first pair of magnetic break-away portions 208*b* is disposed on one side of the smart ring 205*b*, while a second pair of magnetic break-away portions 208*b* is disposed on another side of the smart ring 205*b* opposite the first pair of magnetic break-away portions 208*b*. Alternatively, only one pair of magnetic break-away portions 208*b* may be disposed on the body 207*b*, such as a single pair of magnetic break-away portions 208*b* disposed on only one of the two sides of the body 207*b* and still fall within the scope of the present disclosure.

Figure 5B:
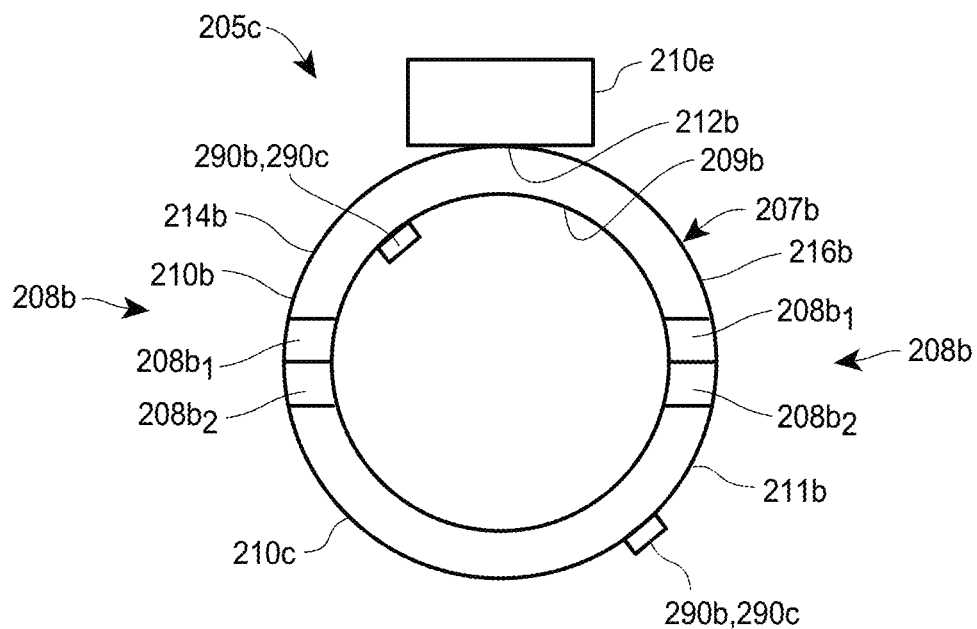
FIG. 5B is a view of another smart ring depicted in FIG. 2 according to some embodiments.

Referring now to FIG. 5B, the smart ring 205*c* of FIG. 2 is depicted with some additional features. In particular, and like the smart ring 205*b* of FIG. 5A, the smart ring 205*c* includes all the same features except the smart ring 205*c* of FIG. 5B further includes a housing 210*e* coupled to the body 207*b* of the smart ring 205*c*. As a result, the parts of the smart ring 205*c* identical to parts of the smart ring 205*b* will not be described again here for the sake of brevity.

More specifically, the smart ring 205*c* of FIG. 5B may include the housing 210*e* coupled to the body 207*b*. In one example, the housing 210*e* is coupled to a top area 212*b* of the body 207*b*. However, it will be appreciated that the housing 210*e* may alternatively be coupled to another area of the body 207*b*, such as a first side area 214*b*, a second side area 216*b*, or any other area of the smart ring 205*c* configured to receiving the housing 210*e* and still fall within the scope of the present disclosure. The housing 210*e* may include one or more of the previously defined components 102, such as one or more of the battery 120, the charging unit 130, the controller 140, the processor unit 142, the memory unit 144, the sensor unit 150, the user input unit 170 or the output unit 190. In addition to the housing 210*e*, the body 207*b* may likewise include one or more of the battery 120, the charging unit 130, the controller 140, the processor unit 142, the memory unit 144, the sensor unit 150, the user input unit 170 or the output unit 190.

Figure 6:
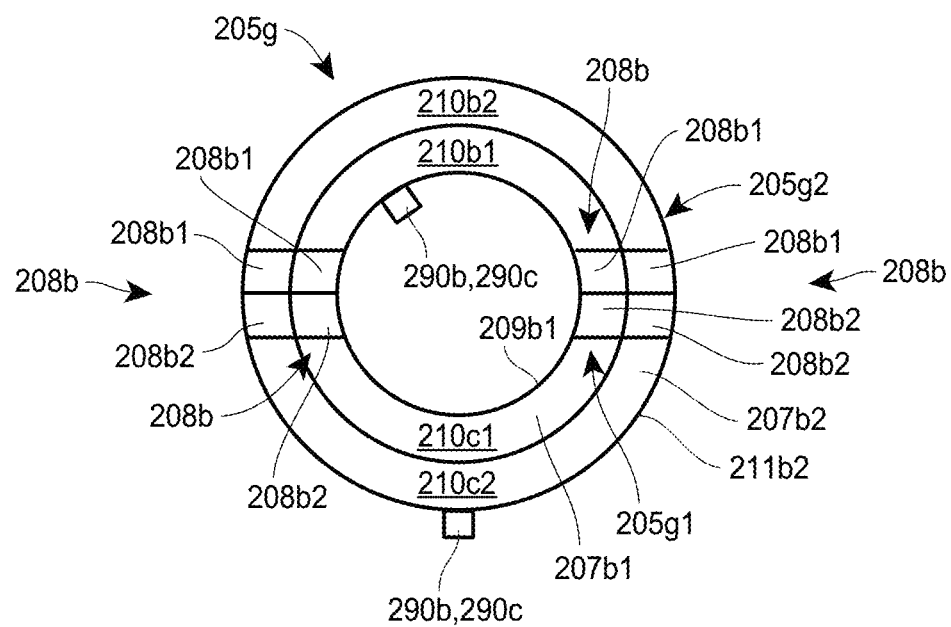
FIG. 6 is a view of another smart ring depicted in FIG. 2 according to some embodiments.

Referring now to FIG. 6, the smart ring 205*g* of FIG. 2 is depicted with some additional features. In particular, and like the smart ring 205*g* of FIG. 2, the smart ring 205*g* includes the first ring 205*g*1 and the second ring 205*g*2. Each of the first and second rings 205*g*1 and 205*g*2 includes a body 207*b*1 and 207*b*2, respectively, such as a housing. The body 207*b*1 of the first ring 205*g*1 includes a first part 210*b*1 and a second part 210*c*1 that is removably connected to the first part 210*b*1. Likewise, the body 207*b*2 of the second ring 205*g*2 includes a first part 210*b*2 and a second part 210*c*2 that is also removably connected to the first part 210*b*2. Each of the body 207*b*1 and the body 207*b*2 may include a flexible material, such as any material configured to bending or conforming to a user's finger, for example. Each body 207*b*1, 207*b*2 further includes one pair of break-away portions 208*b* disposed within the body 207*b*1, 207*b*2 adjacent to and separate from the first and second parts 210*b*1, 210*c*1 or 210*b*2, 210*c*2, as relevant. The at least one pair of break-away portions 208*b* are attached to the first and second parts 210*b*1, 210*b*2, 210*c*1, 210*c*2, respectively, connecting the second part 210*c*1, 210*c*2 to the first part 210*b*1, 210*b*2, as explained more below. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 210*b*1, 210*b*2 or the second part 210*c*1, 210*c*2 of the body 207*b*1, 207*b*2, respectively.

In one example, the at least one pair of break-away portions 208*b* may include the at least one pair of magnetic break-away portions 208*b*. The at least one pair of magnetic break-away portions 208*b* may include a first magnetic break-away portion 208*b*1 disposed at and/or adjacent to an end of the first part 210*b*1, 210*b*2 of the body 207*b*1, 207*b*2. A second magnetic break-away portion 208*b*2 is disposed at and/or adjacent to an end of the second part 210*c*1, 210*c*2, such that the first and second magnetic break-away portions contact each other to connect the second part 210*c*1, 210*c*2 to the first part 210*b*1, 210*b*2 of the body 207*b*1, 207*b*2. The first break-away portion 208*b*1 includes a magnet M and the second magnetic break-away part 208*B*2 includes a magnet M. The magnets M have opposite polarity and, thus, are attracted to each other to secure the first and second magnetic break-away portions 208*b*1, 208*b*2 together when in contact with each other. In addition, the first and second magnetic break-away portions 208*b*1, 208*b*2 are removable from each other upon movement of the first break-away portion 208*b*1 in a direction away from the second break-away portion 208*b*2. In another example, the first and second magnetic break-away portions 208*b*1, 208*b*2 are removable from each other upon movement of the first part 210*b* in a direction away from the second part 210*c* because the first part 210*b* is attached to the first break-away magnetic portion 208*b*1 and the second part 210*c* is attached to the second break-away magnetic portion 208*b*2.

In addition, the body 207*b*1 of the smart ring 205*g* further includes an inside surface 209*b*1 adapted to contact a finger of a user during use of the smart ring 205*g*. The inside surface 209*b*1 may include one or more of the at least one sensor 290*b* or the output element 290*c*. While the at least one sensor 290*b* or the at least one output element 290*c* are depicted in FIG. 6 as extending from the inside surface 209*b*1 of the smart ring 205*b*, the at least one sensor 290*b* and the at least one output element 290c may additionally and/or alternatively be disposed directly on the inside surface 209b1, but not extend from the inside surface 209b1.

Further, the body 207b2 also includes an outside surface 211b2. In a similar manner, the outside surface 211b2 may include one or more of the at least one sensor 290b or the output element 290c, for example, extending from the outside surface 211b. Alternatively, the at least one sensor 290b or the at least one output element 290c may not extend from the outside surface 211b2, but instead be directly disposed thereon in the same plane, for example, as the outside surface 211b2, such that no part of the at least one sensor 290b or the at least one output element 290c extends from the outside surface 211b2.

Figure 7:
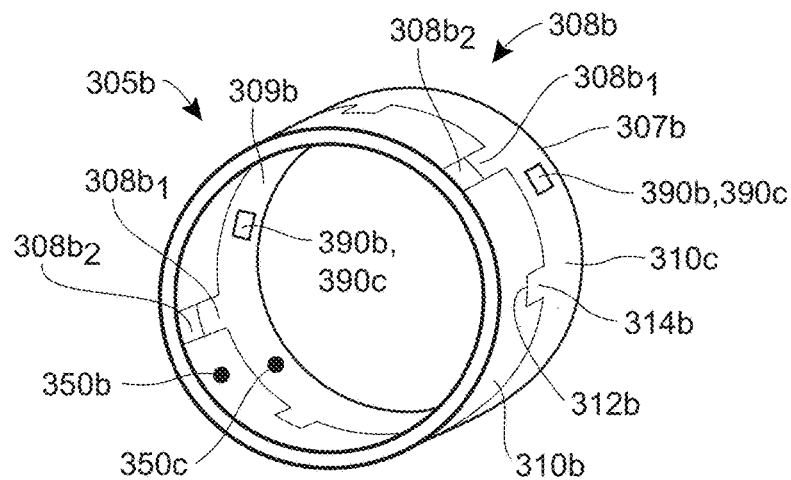
FIG. 7 is a perspective view of a smart ring depicted in FIG. 3 according to some embodiments.

Referring now to FIG. 7, the smart ring 305b of FIG. 3 is depicted with some additional features. As noted above, the smart ring 305b includes multiple body parts that may be separate axially and are in a configuration different from the smart rings 205b and 205c of FIG. 5 and FIG. 6, respectively. In particular, the smart ring 305b includes a body 307b, such as a housing, having the first part 310b and the second part 310c that is axially separate from the first part 310b and removably connected to the first part 210b. In one example, the first body part 310b may be a front body part 310b of the smart ring 305b, and the second body part 310c may be a rear body part 310c of the smart ring 305b. The body 307g may include a flexible material, such as any material configured to bending or conforming to a user's finger, for example. The body 307b further includes a pair of break-away portions 308b disposed within the body 307b adjacent to and separate from the first and second parts 310b, 310c. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 310b or the second part 310c of the body 307b.

The at least one pair of break-away portions 308b may include a pair of magnetic break-away portions. The pair of magnetic break-away portions 308b may include a first break-away magnetic portion 308b1 disposed at and/or adjacent to a portion of the first part 310b of the body 307b. A second magnetic break-away portion 308b2 is disposed at and/or adjacent to a portion of the second part 310c, such that the first and second magnetic break-away portions 308b1, 308b2 contact each other to connect the second part 210c to the first part 210b of the body 207b. The first magnetic break-away portion 308b1 includes a magnet M, and the second magnetic break-away portion 308b2 likewise includes a magnet M. The magnets M have opposite polarity and, thus, are attracted to each other to secure the first and second magnetic break-away portions 308b1, 308b2 together (and, thus, the first and second parts 310b and 310c to which the first and second magnetic break-away portions 308b1, 308b2 are attached) when in contact with each other. In addition, the first and second magnetic break-away portions 308b1, 308b2 are removable from each other upon movement of the first magnetic break-away portion 308b1 in a direction away from the second magnetic break-away portion 308b2. In another example, the first and second magnetic break-away portions 308b1, 308b2 are removable from each other upon movement of the first part 310b in a direction away from the second part 310c because the first part 310b is attached to the first break-away magnetic portion 308b1 and the second part 310c is attached to the second break-away magnetic portion 308b2.

In addition, the body 307b of the smart ring 305b further includes an inside surface 309b adapted to contact a finger of a user during use of the smart ring 205b. The inside surface 309b may include one or more of at least one sensor 390b or an output element 390c. The body 307b may also include an outside surface 311b. In a similar manner, the outside surface 311b may include one or more of the at least one sensor 390b or the output element 390c, for example.

Still further, the smart ring 305b may also include more than one pair of magnetic break-away portions 308b and still fall within the scope of the present disclosure. For example, and as depicted in FIG. 7, the smart ring 305b includes two pairs of magnetic break-away portions 308b. A first pair of magnetic break-away portions 308b is disposed on one side of the smart ring 305b, while a second pair of magnetic break-away portions 308b is disposed on another side of the smart ring 305b opposite the first pair of magnetic break-away portions 208b.

The first body part 310b, such as the front body part 310b, may include one recess 312b adapted to receive a portion of the second body part 311b when the first body part and the second body part 310b, 311b are coupled together. Specifically, the second body part 311b, such as the rear body part 311b, may include one tab 314b extending from a rim of the second body part 311b that fits into the at least one recess 312b of the first body part 310b when coupled to the second body part 311b. As will also be appreciated, and as depicted in FIG. 7, the first body part 310b may further include more than one recess 312b, such as two, three, four, five or more recesses 312b, and the second body part 311b may likewise include more than one tab 314b, such as two, three, four, five or more tabs 314b. So configured, the first body part 310b includes a number of recesses 312b that correspond to or are the same as the number of tabs 314b of the second body part 311b, such that the tabs 314b fit into the recesses 312b when the first body part and the second body part 310b, 311b of the smart ring 305b are coupled together.

In one example, the first magnetic break-away portion 308b1 is disposed adjacent to the recess 21b, and the second magnetic break-away portion 308b2 is disposed on and/or attached to the tab 314b, as depicted in FIG. 7. So configured, the magnets M of each of the first and second magnetic break-away portions 308b1 and 308b2 are attracted to and contact each other, creating a force that maintains contact between the first and second break magnetic break-away portions 308b1, 308b2.

Figure 8:
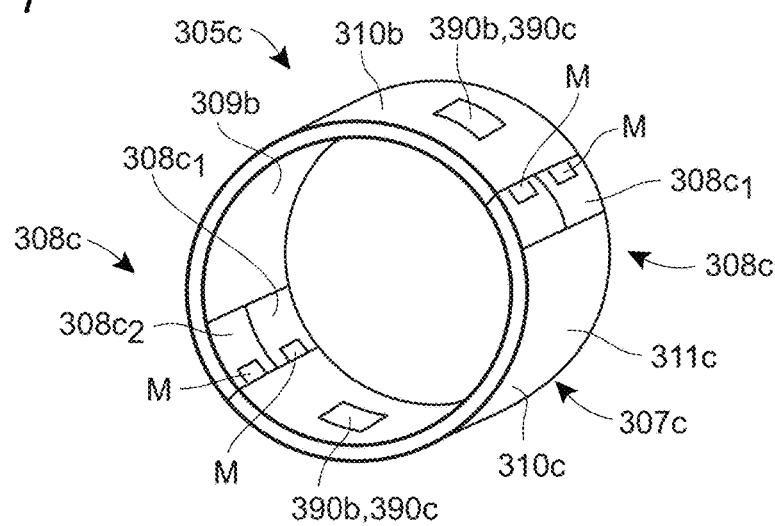
FIG. 8 is a perspective view of another smart ring depicted in FIG. 3 according to some embodiments.

Referring now to FIG. 8, the smart ring 305c of FIG. 3 is depicted with additional features. As noted above, the smart ring 305c again includes multiple body parts in a configuration different from the smart rings 205b and 205c of FIG. 5 and FIG. 6, respectively, and the smart ring 305b of FIG. 7. In particular, the smart ring 305c includes a body 307c, such as a housing, having the first part 310b and the second part 310c that is separate from the first part 310b and removably connected to the first part 310b. In this example, the first body part 310b may be a top body part 310b of the smart ring 305b, and the second body part 310c may be a bottom body part 310c of the smart ring 305b. The body 307c may include a flexible material, such as any material configured to bending or conforming to a user's finger, for example. The body 307c further includes one pair of break-away portions 308c disposed within the body 307c adjacent to and separate from the first and second parts 310b, 310c. Any of the previously defined components 102, such as one or more of the battery 120, the charging unit 130, the controller 140, the processor unit 142, the memory unit 144, the sensor unit 150, the user input unit 170 or the output unit 190 may be disposed in or on one or more of the first part 310*b* or the second part 310*c* of the body 307*c*.

The at least one pair of break-away portions 308*c* may include the at least one pair of magnetic break-away portions 308*c*. The at least one pair of magnetic break-away portions 308*c* includes a first magnetic break-away portion 308*c*1 and a second magnetic break-away portion 308*c*2 disposed adjacent to and in contact with each other. In this example, the first break-away portion 308*c*1 is separate from and attached to the first part 310*b* of the body 307*c*. In addition, the second break-away portion 308*c*2 is separate from and attached to the second part 310*c* of the body 307*c*. The first magnetic break-away portion 308*c*1 includes a magnet M and the second magnetic break-away portion 308*c*2 includes a magnet M. The magnets M have opposite polarity and, thus, are attracted to each other to secure the first and second magnetic break-away portions 308*c*1, 308*c*2 together (and, thus, the first and second parts 310*b*, 310*c*) when in contact with each other. In addition, the first and second magnetic break-away portions 308*c*1, 308*c*2 are removable from each other upon movement of the first break-away portion 308*c*1 in a direction away from the second break-away portion 308*c*2. Likewise, because the first and second magnetic break-away portion 308*c*1, 308*c*2 are attached to the first and second parts 310*b*, 310*c* of the body 307*c*, the first and second magnetic break-away portions 308*b*1, 308*b*2 are also removable from each other upon movement of the first part 310*b* from the second part 310*c* of the body 307*c*.

In addition, the body 307*c* of the smart ring 305*c* further includes an inside surface 309*c* adapted to contact a finger of a user during use of the smart ring 205*c*. The inside surface 309*c* may include one or more of at least one sensor 390*b* or an output element 390*c*. The body 307*c* may also include an outside surface 311*b*. In a similar manner, the outside surface 311*c* may include one or more of the at least one sensor 390*b* or the output element 390*c*, for example.

Figure 9:
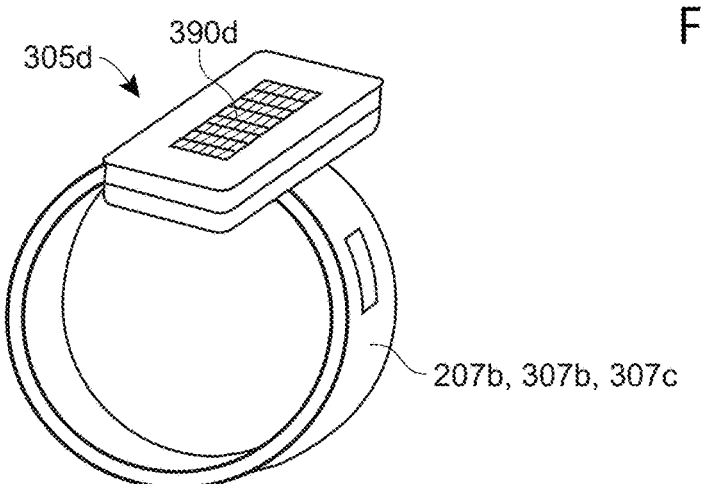
FIG. 9 is a perspective view of another smart ring depicted in FIG. 3 according to some embodiments.

Still further, the smart ring 305*c* may again also include more than one pair of magnetic break-away portions 308*c* and still fall within the scope of the present disclosure. For example, and as depicted in FIG. 8, the smart ring 305*c* includes two pairs of magnetic break-away portions 308*c*. A first pair of magnetic break-away portions 308*c* is disposed on one side of the smart ring 305*c*, while a second pair of magnetic break-away portions 308*c* is disposed on another side of the smart ring 305*c* opposite the first pair of magnetic break-away portions 308*c*. Referring now to FIG. 9, the smart ring 305*d* of FIG. 3 is depicted with some additional features. As noted, the smart ring 305*d* may be an example of a band and platform configuration, and the band may comprise the body 207*b*, 307*b*, and 307*c* of each of the smart rings 205*c*, 305*b*, an 305*c*, respectively, and include any one or all of the features previously described relative to each body 207*b*, 307*b*, and 307*c*. As depicted in FIG. 9, the body 207*b*, 307*b*, and 307*c* of each of the smart rings 205*c*, 305*b*, and 305*c* may include an output device 390 separate from and coupled to a portion of the body 207*b*, 307*b*, and 307*c*. While the output device 390 is disposed in a top area of the body 207*b*, 307*b*, and 307*c*, the output device 390 may alternatively be disposed on another area of the body 207*b*, 307*b*, and 307*c*, such as one or more side areas, and still fall within the scope of the present disclosure. The output device 390 may include one or more of an LCD display, an OLED display, e-ink displays, one or more LED pixels, or a speaker.

Each of the foregoing smart rings 205*b*, 205*c*, 205*g*, 305*b*, 305*c*, and 305*d* may include one or more of a portion of the body 207*b*, 207*b*1, 207*b*2, 307*b*, and 307*c* comprising an electric sensor fabric material. In addition, each body 207*b*, 207*b*1, 207*b*2, 307*b*, and 307*c* may include silicone material adapted to function as part of one of an artificial muscle or a nerve. The silicone material is configured to one or more of generating electricity or sensing pressure. Moreover, each body 207*b*, 207*b*1, 207*b*2, 307*b*, and 307*c* may be one of additively manufactured or heat molded according to a user's dimensions obtained by one of scanning or photographing a portion of the user's hand or a mold indicative of the user's finger dimensions, for example, as explained more below.

Figure 10:
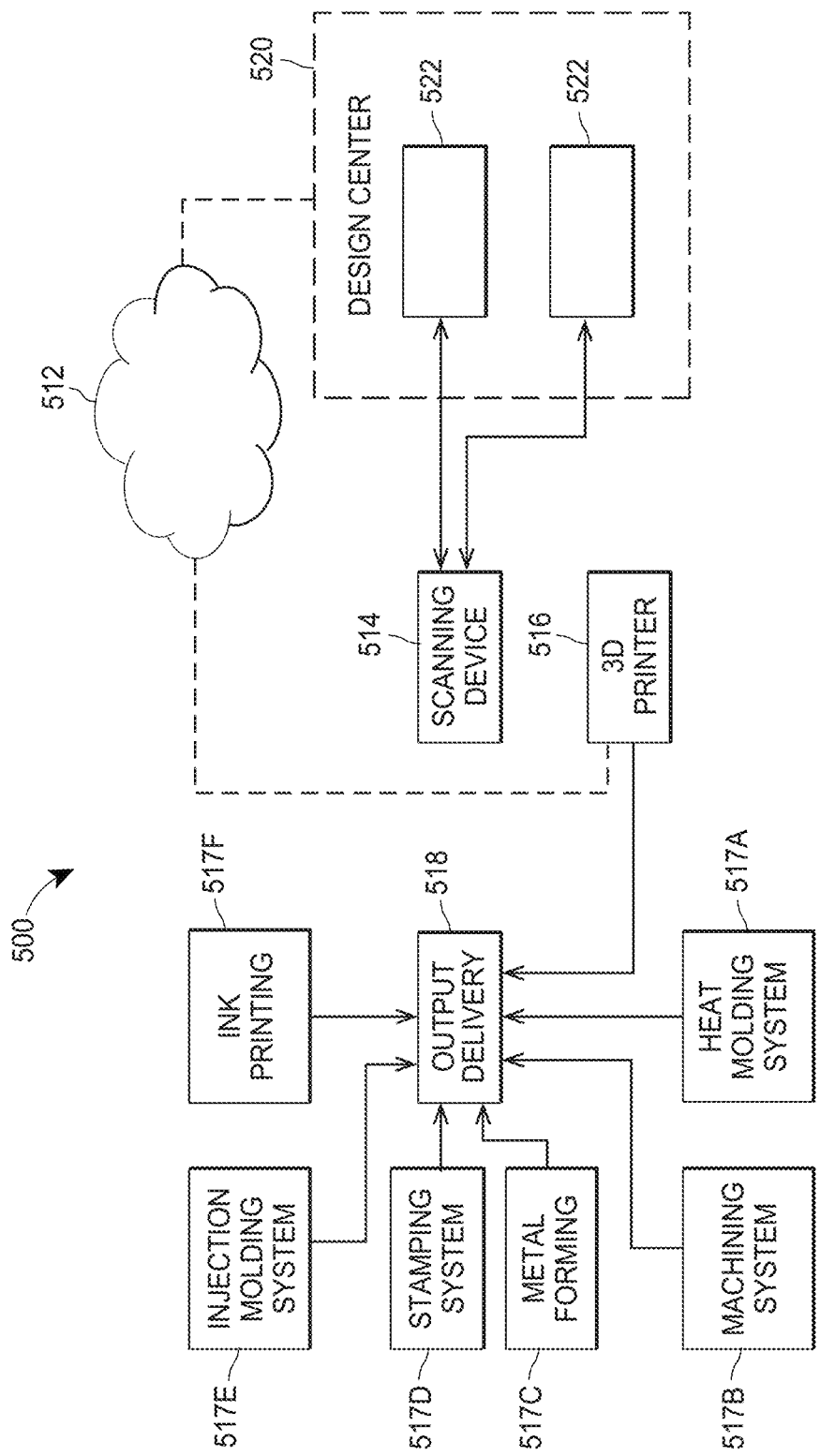
FIG. 10 is a perspective view of a system for manufacturing a smart ring according to an aspect of the present disclosure.
Figure 11:
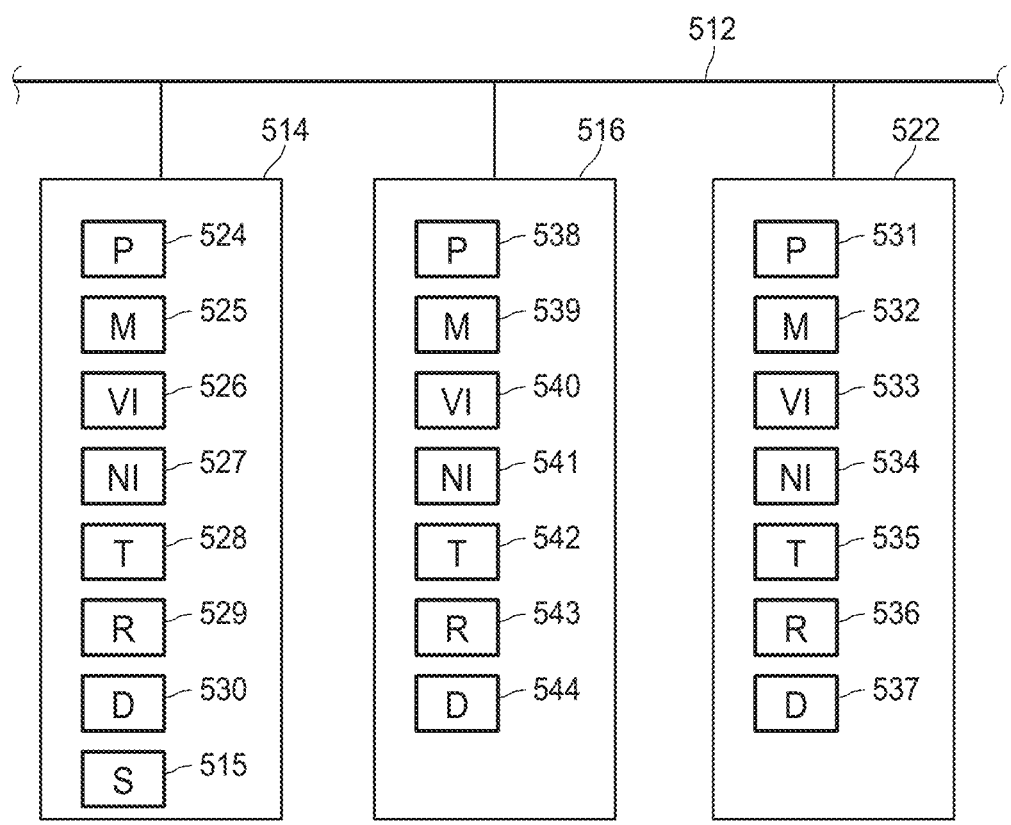
FIG. 11 is a block diagram of a portion of the system of FIG. 10 according to some embodiments.

Referring now to FIG. 10, a system 500 for manufacturing any one of the foregoing smart rings is depicted. The system 500 includes a communication network 512, a scanning device 514 communicatively coupled to the communication network 512, such as a wireless network, and a design center 520 also communicatively coupled to the scanning device 514 and the communication network 512, as depicted in FIG. 10. The scanning device 514 scans a user's body part, such as the user's finger, to create a user-specific scan for the smart ring. The scanning device 514 may include one or more various known computing devices, such as an iPad, an iPod, an iPhone or any other smart phone, tablet or other device having such scanning capabilities, for example, and may further include a volumetric capture sensor 515 (FIG. 11). The user-specific scan is later used to make the additively manufactured smart ring via a 3D printer, as described more below.

The system 500 further includes a 3D printer 516, which additively manufactures the user-specific smart ring, and an output delivery center 518 for delivery of a final and complete additively manufactured smart ring. The system 500 further includes a design system 520 communicatively coupled to both the scanning device 514 and the 3D printer 516. In one example, the design system 520 is communicatively coupled via the communication network 521, such as wireless network 21. As depicted, the design system 520 includes one or more computing devices 522 that may receive data corresponding to a scan of the user's finger or hand via the scanning device 514. At least one computing device 522 of the design system 520 then sends the user-specific design to the 3D printer 516, such as via the wireless network 521, directing the 3D printer 16 to additively manufacture one of the foregoing smart rings according to the user-specific design.

Alternatively and/or additionally, the system 500 for manufacturing any one of the foregoing smart rings may include a heat molding system 517A, a machining system 517B, a metal forming system 517C, a stamping system 517D, an injection molding system 517E, and/or an ink printing system 517F, each of which is coupled to the output delivery center 518 for delivery of the complete smart ring, as depicted in FIG. 10.

Referring now to FIG. 11, in one example, the scanning device 514 includes one or more processors 524 that implement a scanning module stored in a memory 525 of the scanning device 514 to scan a finger or a portion of a hand of the user. The scanning device 514 may also include a user-input 526 and a network interface 527, which allows the scanning device 514 to be communicatively coupled to the wireless network 521, for example, and communicate with the design system 520. The scanning device 514 further includes a transmitter 528 and a receiver 529, such that the transmitter 528 transmits scanned data corresponding to the user-specific scan (e.g., of the finger of the user) to the design system 520 for processing, as explained more below. Further, the scanning device 514 may also include a display 530 on which the scanned data corresponding to the user may be displayed, for example.

In a similar manner, the one or more computing devices 522 of the system 520 also includes one or more processors 531 that implement a module stored in a memory, such as a memory 532 of the computing device 522, to receive and process data corresponding to the user-specific scan from the scanning device 514. The computing device 522 may also include a user-input 533 and a network interface 534, which allows the computing device to be communicatively coupled to the wireless network 521 and communicate with both the scanning device 514 and the 3D printer 516. The design system computing device 522 may also include a transmitter 535 and a receiver 536, such that the transmitter 535 transmits processed data relative to a user-specific scan (e.g., from the scanning device 14) to the 3D printer 516, directing the 3D printer 516 to print a smart ring according to the user-specific scan. The receiver 536 receives scanning data from the scanning device 514, which is processed by one or more processors 531 of the computing device 522 and used to implement the operation of the 3D printer 516. The computing device 522 also includes a display 537, on which data, such as data from the scanning device 514 and data processed by the computing device 522, may be displayed.

Still referring to FIG. 11, the 3D printer 516 is communicatively coupled to both the scanning device 514 and the design system 520. The 3D printer 516 includes one or more processors 538 that implement a user-specific smart ring profile created and then transmitted from the computing device 322 of the design system to the 3D printer 316 and stored in a memory 539 of the 3D printer 516. The user-specific smart ring design profile that may be stored in the memory 539 of the 3D printer 16 includes a user-specific design protocol for execution by one or processors 538 of the 3D printer 516. The 3D printer 516 may also include a user-input 540 and a network interface 541, which also allows the 3D printer 516 to be communicatively coupled to the wireless network 521, for example. The 3D printer 516 further includes a transmitter 542, a receiver 543 for receiving data from the design system 520 relative to a user-specific smart ring profile, for example, and a display 544, which may include or be separate from the user-input 540.

Each of the processors 524, 531, and 538 may be a general processor, a digital signal processor, ASIC, field programmable gate array, graphics processing unit, analog circuit, digital circuit, or any other known or later developed processor. The processor 524 of the scanning device 514 may operate pursuant to a profile stored in the memory 525 of the scanning device 514, for example. The memory 525, 532, 539 may be a volatile memory or a non-volatile memory. The memory 525, 532, 539 may include one or more of a read-only memory ("ROM"), random-access memory ("RAM"), a flash memory, an electronic erasable program read-only memory ("EEPROM"), or other type of memory. The memory 525, 532, 539 may include an optical, magnetic (hard drive), or any other form of data storage.

In one example, the user-specific smart ring design protocol is part of the user-specific design profile stored on the memory 532, 539 and includes a set of executable instructions that controls the 3D printer 516 to print the user-specific smart ring. The user-specific smart ring design protocol may be stored on the memory 532, 539 as computing logic, which includes one or more routines and/or sub-routines, embodied as computer-readable instructions stored on the memory 532, 539. The processor 531, 538 can execute the logic to cause the processor 531, 538 to retrieve the profile and control the 3D printer 516 in accordance with the user-specific smart ring design profile. In particular, the user-specific smart ring design protocol may specify, among other parameters, the size, shape and/or volume of the finger for the smart ring and the timing of the 3D printing.

In view of the foregoing, it will be understood that the foregoing described smart rings 205b, 205c, 205g, 305b, 305c and 305d may be manufactured according to the following method 600 of manufacture. Specifically, the method 600 is a method of manufacturing the smart ring 205b, 205c, 205g, 305b, 305c and 305d comprising creating the first part 210b, 210b1, 210b2, 310b with a flexible material by one of heat molding, such as using a heat molding system 517A, injection molding, such as using the injection molding system 517B, ink printing, such as using the ink printing system 517F, stamping, such as using the stamping system 517D, metal forming, such as using the metal forming system 517C, machining, or additive manufacturing, using for example the 3D printer 516 (FIG. 10). The method 600 further comprises creating the second part 210c, 210c1, 210c2, 310c with a flexible material and again by one of heat molding, injection molding, ink printing, stamping, metal forming, machining, or additive manufacturing and coupling the second part 210c, 210c1, 210c2, 310c to the first part 210b, 210b1, 210b2, 310b, respectively.

The method 600 further comprises coupling the pair of magnetic break-away portions 208b, 308b, 308c to first part 210, 210b, 210b1, 210b2, 310b and the second part 210c, 210c1, 210c2, 310c, such that the first magnetic break-away portions 208b1, 308b1, 308c1 are disposed adjacent to and in contact with the second magnetic break-away portions 208b2, 308b2, 308c2. The method also includes disposing one or more of the battery 120, the charging unit 130, the controller 140, the processor unit 142, the memory unit 144, the sensor unit 150, the user input unit 170 or the output unit 190 may be disposed in or on one or more of the first part 210b, 210b1, 210b2, 310b or the second part 210c, 210c1, 210c2, 310c of the body 207b, 207b1, 207b2, 307b, 307c.

Several advantages of the foregoing smart rings will be appreciated. For example, by using the aforementioned flexible material for at least part of the body of the smart rings and the at least one pair of magnetic break-away portions, the smart ring is able to be easily removed from the user, such as during any emergency situation. Further, by heat molding or additively manufacturing the foregoing smart rings, the smart rings are able to be customized to a user's exact finger, for example, creating a better fitting smart ring for user comfort and satisfaction.

Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems configured to sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be configured to high volume transmissions while some nodes may be configured to sending and receiving relatively little traffic over the same period of time. Additionally, the connections between nodes on a network may have different throughput capabilities and different attenuation characteristics. A fiberoptic cable, for example, may be configured to providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) configured to sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A smart ring comprising:
a body comprising:
a first part comprising at least a part of a sensor unit;
a second part comprising at least a part of an output unit, wherein the second part of the body is removably connected to the first part of the body; and
a pair of removable portions separate from the first part of the body and the second part of the body, and comprising:
a first removable portion removably connected to the first and second parts of the body; and
a second removable portion removably connected to the first and second parts of the body, wherein:
the pair of removable portions removably couple together the first and second parts of the body.

2. The smart ring of claim 1, wherein the body further comprises an inside surface adapted to contact a finger of a user during use of the smart ring, and wherein the sensor unit or the output unit is disposed on the inside surface.

3. The smart ring of claim 1, wherein at least a portion of the body comprises an electric sensor fabric material.

4. The smart ring of claim 1, wherein at least a portion of the body comprises a silicone material adapted to function as part of one of an artificial muscle or a nerve, and wherein the silicone material is configured to generate electricity or sense pressure.

5. The smart ring of claim 1, wherein the body further comprises an outside surface and an inside surface opposite the outside surface and configured to be closer to a finger of a user than the outside surface when the smart ring is worn on the finger of the user, and wherein the sensor unit or the output unit is disposed closer to the outside surface than the inside surface.

6. The smart ring of claim 1, wherein:
the first removable portion comprises a first magnet; and
the second removable portion comprises a second magnet.

7. The smart ring of claim 1, wherein the sensor unit comprises at least one sensor selected from one or more of a touch sensor, a biometric sensor, a temperature sensor, an electronic sensor, an acceleration sensor, a sound sensor, or a light sensor.

8. The smart ring of claim 1, further comprising:
a housing coupled to the body, wherein:
at least one component disposed at least partially within the housing is selected from one or more of a battery, a charging unit, a processing unit, a user input unit, a communication unit, a memory unit, a second part of the sensor unit, or a second part of the output unit.

9. The smart ring of claim 1, wherein:
the output unit is coupled to an output device; and
the output device comprises a display or a speaker.

10. The smart ring of claim 1, wherein:
the first part of the body comprises a recess;
the second part of the body comprises a tab adapted to be disposed within the recess when the first part of the body and the second part of the body are connected to each other;
the first removable portion is disposed adjacent to the recess; and
the second removable portion is disposed on or attached to the tab, such that the first removable portion and the second removable portion are adjacent to each other when the tab is disposed within the recess.

11. The smart ring of claim 1, wherein:
the first part of the body is a top body part;
the second part of the body is a bottom body part;
the first removable portion is attached to the top body part; and
the second removable portion is attached to the bottom body part, such that the first removable portion and the second removable portion are adjacent to and in contact with each other when the bottom body part is connected to the top body part.

12. A method of manufacturing a smart ring, the method comprising:
creating a first part of a body, wherein:
the first part of the body comprises at least a part of a sensor unit;
creating a second part of the body, wherein:
the second part of the body comprises at least a part of an output unit; and
the second part of the body is removably connected to the first part of the body; and
providing a pair of removable portions separate from the first part of the body and the second part of the body, and comprising:
a first removable portion removably connected to the first and second parts of the body; and
a second removable portion removably connected to the first and second parts of the body, wherein:
the pair of removable portions removably couple together the first and second parts of the body.

13. The method of claim 12, wherein the first pair of removable portions comprise a pair of magnetic removable portions.

14. The method of claim 12, further comprising wherein:
at least one of:
creating the first part of the body comprises disposing the sensor unit at an inside surface of the body; or
creating the second part of the body comprises disposing the output unit at the inside surface of the body; and a finger of a user is closer to the inside surface of the body than the outside surface of the body opposite the inside surface of the body when the smart ring is worn on the finger of the user.

15. The method of claim 12, wherein:
at least one of:
creating the first part of the body comprises disposing the sensor unit; or
creating the second part of the body comprises disposing the output unit on an outside surface of the body; and
a finger of a user is closer to the inside surface of the body than the outside surface of the body opposite the inside surface of the body when the smart ring is worn on the finger of the user.

16. The method of claim 15, wherein the output unit comprises at least one component selected from one or more of an LCD display, an OLED display, one or more e-ink displays, one or more LED pixels, or a speaker.

17. A system for additively manufacturing a smart ring, the system comprising:
a communication network;
a scanning device communicatively coupled to the communication network and comprising:
a non-volatile memory configured to store a scanning module, and
at least one processor configured to execute the scanning module to create a user-specific scan; and
a computing device communicatively coupled to the communication network, wherein when a module stored in the non-volatile memory of the computing device is executed by at least one processor of the computing device, the computing device is configured to:
receive data from the scanning device relating to the user-specific scan; and
create a user-specific smart ring profile based at least in part on the data received from the scanning device, wherein the user-specific smart ring profile is adapted to be transmitted to a 3D printer to implement the user-specific smart ring profile, and wherein the 3D printer is configured to receive the user-specific smart ring profile from the computing device and implement the user-specific smart ring profile to additively manufacture the smart ring comprising:
a body comprising:
a first part;
a second part removably connected to the first part of the body; and
a pair of removable portions separate from the first part of the body and the second part of the body, and comprising:
a first removable portion removably connected to the first and second parts of the body; and
a second removable portion removably connected to the first and second parts of the body,
wherein:
the first part of the body comprises at least a part of a sensor unit;
the second part of the body comprises at least a part of an output unit; and
the pair of removable portions couple together the first and second parts of the body.

18. The system of claim 17, wherein the body further comprises an inside surface configured to be closer to a finger of a user during use of the smart ring than an outside surface of the body, and wherein at least one of the sensor unit or the output unit is disposed at the inside surface.

19. The system of claim 17, wherein the at least a portion of the body comprises an electric sensor fabric material.

20. A smart ring comprising:
    a body comprising:
        a first part comprising at least a part of a sensor unit;
        a second part removably connected to the first part of the body and comprising at least a part of an output unit; and
        a means for removably connecting the first part of the body to the second part of the body, wherein:
            the means for removably connecting the first part of the body to the second part of the body comprises a first portion connected to the first part of the body and a second portion connected to the second part of the body;
            the first portion of the means for removably connecting the first part of the body to the second part of the body is removable from the first and second parts of the body; and
            the second portion of the means for removably connecting the first part of the body to the second part of the body is removable from the first and second parts of the body.

* * * * *